US008478501B1

(12) United States Patent
Adams

(10) Patent No.: US 8,478,501 B1
(45) Date of Patent: Jul. 2, 2013

(54) METHODS FOR DETERMINING EXHAUST EMISSIONS AND EFFICIENCY OF A VEHICLE AND A DISPLAY

(71) Applicant: Greendrive Pty. Ltd, Hurstville (AU)

(72) Inventor: Danny Hyland Stewart Adams, Hurstville (AU)

(73) Assignee: Greendrive Pty, Ltd (AU)

( * ) Notice: Subject to any disclaimer, the term of this patent is extended or adjusted under 35 U.S.C. 154(b) by 0 days.

(21) Appl. No.: 13/668,806

(22) Filed: Nov. 5, 2012

Related U.S. Application Data

(62) Division of application No. 13/470,961, filed on May 14, 2012, now Pat. No. 8,332,121.

(51) Int. Cl.
*B60T 8/32* (2006.01)

(52) U.S. Cl.
USPC ............ 701/93; 701/66; 701/101; 73/114.71; 73/23.31; 60/278

(58) Field of Classification Search
USPC .... 701/66, 93, 101; 73/114.71, 23.31; 60/278
See application file for complete search history.

(56) References Cited

U.S. PATENT DOCUMENTS

| 5,578,748 A | 11/1996 | Brehob |
| 5,639,957 A | 6/1997 | Zarchy |
| 5,652,378 A | 7/1997 | Dussault |
| 6,155,212 A | 12/2000 | McAlister |
| 6,405,706 B1 | 6/2002 | Hammoud |
| 6,505,465 B2 | 1/2003 | Kanazawa |
| 6,577,973 B1 | 6/2003 | Freitag |
| 7,543,668 B1 | 6/2009 | Schechter |
| 8,046,150 B2 | 10/2011 | Anilovich |
| 2001/0023585 A1 | 9/2001 | Dolling |
| 2003/0125857 A1 | 7/2003 | Madau |
| 2007/0256481 A1 | 11/2007 | Nishiyama |
| 2009/0012673 A1 * | 1/2009 | Hori et al. ........................ 701/31 |
| 2009/0281717 A1 | 11/2009 | Nambata |

FOREIGN PATENT DOCUMENTS

| CA | 2326469 | 5/2002 |
| JP | 05142174 | 6/1993 |
| JP | 2002332829 | 11/2002 |
| JP | 2004169607 | 6/2004 |
| JP | 2009264221 | 11/2009 |

* cited by examiner

*Primary Examiner* — Gertrude Arthur Jeanglaude

(74) *Attorney, Agent, or Firm* — Mayback & Hoffman, P.A.; Gregory L. Mayback

(57) ABSTRACT

Methods, software codes, and devices for determining an emission flow rate of one or more $CO_2$ equivalent gases from an exhaust system of an internal combustion engine of a vehicle and a method of determining a vehicle efficiency factor of the vehicle are provided. The vehicle efficiency factor is compared in real time to the corresponding point on a vehicle efficiency map based on at least one of current vehicle conditions, driving conditions, environmental conditions, and energy flow visualization data to derive a driver efficiency factor.

17 Claims, 4 Drawing Sheets

METHODS FOR DETERMINING EXHAUST EMISSIONS AND EFFICIENCY OF A VEHICLE AND A DISPLAY

CROSS-REFERENCE TO RELATED APPLICATIONS

This application is:
a divisional application of U.S. patent application Ser. No. 13/470,961 filed on May 14, 2012, now U.S. Pat. No. 8,332,121, (which application is a continuing application, under 35 U.S.C. §120, of international application No. PCT/AU10/001,531, filed Nov. 15, 2010, which designated the United States and was published in English, and also claims the priority, under 35 U.S.C. §119, of Australian patent application No. 2009905556, filed Nov. 13, 2009),
the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention relates to exhaust emissions and vehicle efficiency, in particular to determining and displaying exhaust emissions and efficiency of a vehicle.

The invention has been developed primarily for use in vehicles and will be described hereinafter with reference to this application. However, it will be appreciated that the invention is not limited to this particular field of use.

BACKGROUND OF THE INVENTION

Air pollution from automotive emissions is both an environmental and economic problem. As such, many nations of the world are seeking to reduce their carbon emissions and reliance on fossil fuels and are implementing, or considering, initiatives such as carbon trading schemes and renewable energy targets. Innovative solutions are required to help address these significant issues in the short and long terms, solutions that provide individuals, industry, and nations alike with the ability to minimize fossil fuel usage and greenhouse gas emissions.

In recent years, vehicle manufacturers have made great steps toward creating vehicles that are more efficient. This has been achieved primarily by adding better technology, offering tighter control of engine management and other vehicle power train innovations such as hybrid systems. Even so, because of the large number of factors affecting vehicle efficiency, and broad vehicle operating ranges, the efficiency of vehicles is not fixed, but varies greatly based on factors including operating conditions and driving style.

The way a vehicle is driven has a profound effect on efficiency; a United States government website www.fueleconomy.gov states that changing driving style can reduce fuel consumption by up to 33%. If the world's vehicles were driven more efficiently, operating costs could be reduced significantly, and fuel demand and consumption could be reduced by several hundred million liters per day. This could be achieved immediately with the world's current vehicle fleet. However, due to the large number of factors affecting vehicle efficiency, which is undoubtedly further compounded by the multitude of different vehicles and driving conditions that exist, drivers are generally unaware of how to drive their vehicle at optimum efficiency in every driving condition.

There is currently great awareness of the impact of using fossil fuels in terms of climate change, and along with it, a known need to reduce this impact. This is particularly important for the automotive sector as these vehicles run almost exclusively on fossil fuels. The first challenge in addressing this problem is to accurately measure the greenhouse gas emissions from vehicles, these measurements may then become the basis for actions such as carbon accounting and offsets. Typically, accounting of motor vehicle carbon emissions is done as a post-calculation at intervals during the year, based on either total volume of fuel consumed or, even more crudely, based on the distance travelled by the vehicle. Alternatively, a fuel-based method is generally more accurate and relies on a centrally collated source of data, such as fuel purchase data, the latter which not only includes the volume of fuel consumed but also the type and grade of the fuel at each fill-up. However, both of these methods still only provide an estimation of carbon emissions because, even on the simplest level, not all fuel consumed is actually burned and, for even a given type and grade of fuel, the carbon emissions generated by a given volume of burned fuel varies greatly depending on many engine and vehicle exhaust system operating conditions, the driving conditions, and various environmental conditions. Moreover, the levels of many of the non-carbon emissions from the tailpipe of a vehicle are even more sensitive to these operating, driving and environmental conditions.

It is to be understood that, if any prior art information is referred to herein, such reference does not constitute an admission that the information forms part of the common general knowledge in the art, in Australia or any other country.

Thus, a need exists to overcome the problems with the prior art systems, designs, and processes as discussed above.

SUMMARY OF THE INVENTION

The invention provides methods of determining and displaying exhaust emissions and efficiency of a vehicle that overcome or substantially ameliorates the hereinafore-mentioned disadvantages of the heretofore-known devices and methods of this general type, or at least provide alternatives thereto.

According to a first aspect of the present invention, there is provided a method for determining an emission flow rate of one or more $CO_2$ equivalent gases from an exhaust system of an internal combustion engine of a vehicle, the engine powered by a fuel and the exhaust system comprising a catalytic converter, the method comprising:
  collecting fuel data for the fuel;
  generating an emissions factor for each of the one or more $CO_2$ equivalent gases;
  collecting engine data for the engine;
  collecting catalyst data for the catalyst;
  generating a combustion factor for each of the one or more $CO_2$ equivalent gases; and generating the emission flow rate for the one or more $CO_2$ equivalent gases based on the flow rate of the fuel and the respective emissions factor and the combustion factor.

Advantageously, the emissions of one or more $CO_2$ equivalent gases from the exhaust system of a vehicle can be accurately calculated in real time based on the real time monitoring of redox reactions occurring in relation to vehicle operation. Accurate information on actual emissions from vehicles is crucial for assessing environmental impacts of air pollution and for establishing the most cost-effective ways of addressing the problem of air pollution from vehicles. From an individual perspective, this is beneficial as it enables drivers with measures to track the environmental footprint of their vehicle and to compare the emissions of the vehicle with standard emissions data from the vehicle manufacturer, fuel supplier or relevant monitoring bodies (e.g., government agencies). Based upon this comparison, the drivers can optimize their driving performance or vehicle parameters to meet the emission standards. This is also beneficial as it allows incorporation of a user interface for tracking and monitoring of carbon offsets, trading and credits to give, for example, a more accurate assessment of the cost of operating a vehicle; or displaying, for example, the carbon neutral status of the vehicle.

In an exemplary embodiment, the $CO_2$ equivalent gas is $CO_2$ gas, and the combustion factor is an oxidation factor.

In an exemplary embodiment, the $CO_2$ equivalent gas is $CH_4$, unburnt or partially burnt hydrocarbons (HC), CO, $N_2O$ or other nitrogen oxides ($NO_x$), $SO_2$ or other sulfur oxides ($SO_x$), or non-methane volatile organic compounds (NM-VOC), and the combustion factor is a vehicle factor.

Advantageously, the emissions take into account the content of a non-$CO_2$ greenhouse gases such as $CH_4$ and $N_2O$, and also non-$CO_2$ gas pollutants that are not normally considered as greenhouse gases such as CO, $NO_x$ (excluding $N_2O$), NMVOC (non-methane volatile organic compounds), unburnt or partially burnt hydrocarbons (HC), and $SO_2$.

In an exemplary embodiment, the engine data includes one or more of the measured values of air/fuel ratio, pre-catalyst oxygen sensor, engine RPM, ignition advance, torque, throttle position, coolant temperature, barometric pressure, intake air temperature, engine vibration (knock), and engine misfire data.

Advantageously, the emissions take into account one or more of the measured values of air/fuel ratio, pre-catalyst oxygen sensor, engine RPM, ignition advance, torque, throttle position, coolant temperature, barometric pressure, intake air temperature, engine vibration (knock), and engine misfire data.

Advantageously, the engine data can be obtained from relevant sensors located within the vehicle by accessing the engine or chassis serial communications bus (e.g., a Controller-Area Network bus or CAN bus) or the on-board diagnostics system. For example, an automotive oxygen sensor can help determine, in real time, the deviation, if any, of the air/fuel ratio of a combustion engine from the stoichiometric air/fuel ratio and express the deviation as a normalized measure independent of fuel type such as "lambda" or "equivalence ratio"; or obtain engine misfire data, if any.

In an exemplary embodiment, the catalyst data includes the catalyst type and one or more of the measured values of catalyst temperature, age, poisoning factors, post-catalyst oxygen sensor, secondary air status flags, and catalyst malfunction flags.

Advantageously, the emissions take into account the catalyst type and one or more of the measured values of catalyst temperature, catalyst age, catalyst poisoning factors, post-catalyst oxygen sensor, secondary air status flags, and catalyst malfunction flags.

Advantageously, the catalyst data can be obtained from relevant sensors located within the vehicle by accessing the vehicle or chassis serial communications bus (e.g., CAN bus) or the on-board diagnostics system. For example, one way to detect catalyst malfunction makes use of on-board diagnosis using an oxygen sensor located downstream of the catalyst. The ageing of the catalyst is accompanied by a loss of oxygen storage capability. A new catalyst used in conjunction with, for example, a two stage lambda closed loop control system or a linear lambda control system exhibits extremely suppressed lambda amplitude of an almost constant air/fuel ratio value downstream of the catalyst due to catalyst storage. As the catalyst is aged, the lambda amplitude of the exhaust gas correspondingly increases, thereby presenting a possible way of measuring catalyst efficiency.

In an exemplary embodiment, the step of collecting the fuel data is carried out by inputting of a fuel type to a lookup table or, alternatively, downloading the relevant fuel data from the Internet based on one or more of the parameters fuel type, fuel origin, fuel blend factors, and fuel seasonal factors.

Advantageously, the emissions may take into account the fuel type, fuel origin, fuel blend factors, and fuel seasonal factors.

Advantageously, comparison of fuel data from the lookup table with fuel data from, for example, the Internet allows the most accurate and current fuel data based on the fuel type used and, also in some instances, based on the fuel origin, fuel blend factors, and fuel seasonal factors.

In an exemplary embodiment, the step of generating the emissions factor is based on the fuel data, and is derived using mathematical calculation or reference to a lookup table.

Advantageously, the emissions factor is automatically generated in real time. In an exemplary embodiment, in a further step, a pre-catalyst gas content value is generated based on the fuel data, the engine data and the emissions factor, and is derived using mathematical calculation or reference to a lookup table.

Advantageously, this pre-catalyst gas content value is automatically generated in real time.

In an exemplary embodiment, in a further step, a post-catalyst gas content value is generated based on the respective pre-catalyst gas content value, the catalyst data, and the fuel data, and is derived using mathematical calculation or reference to a lookup table.

Advantageously, the emissions take into account the pre-catalyst gas content value, the catalyst data, and the fuel data.

Advantageously, the post-catalyst gas content value is automatically generated in real time.

In an exemplary embodiment, the step of generating the combustion factor is based on the respective post-catalyst gas content value, and is derived using mathematical calculation or reference to a lookup table.

Advantageously, the emissions take into account the post-catalyst gas content value. Advantageously, the combustion factor is automatically generated in real time.

In an exemplary embodiment, the emission flow rate is a volumetric flow rate or a mass flow rate.

Advantageously, the exhaust system acts as a control volume that allows determination of the emission flow rate.

In an exemplary embodiment, the volumetric flow rate or the mass flow rate is measured over a predetermined elapsed time to derive respectively either a gas total volume or a gas total mass.

Advantageously, the volumetric flow rate or the mass flow rate may be integrated over the predetermined elapsed time to derive respectively either a gas total volume or a gas total mass.

In an exemplary embodiment, in a further step, the emission flow rate for each of the one or more $CO_2$ equivalent gases are combined to derive an overall $CO_2$ equivalent emission flow rate.

Advantageously, the overall $CO_2$ equivalent emission flow rate also takes into account the content of non-$CO_2$ greenhouse gases such as $CH_4$ and $N_2O$, and also non-$CO_2$ gas pollutants that are not normally considered as greenhouse gases such as CO, $NO_x$ (excluding $N_2O$), NMVOC (non-methane volatile organic compounds), unburnt or partially burnt hydrocarbons (HC), and $SO_2$.

In an exemplary embodiment, the overall $CO_2$ equivalent emission flow rate is a volumetric flow rate or a mass flow rate.

Advantageously, the exhaust system acts as a control volume that allows determination of the overall $CO_2$ equivalent emission flow rate.

In an exemplary embodiment, in a further step, the volumetric flow rate or the mass flow rate of the $CO_2$ equivalent emission flow rate is measured over a predetermined time interval to derive respectively either a $CO_2$ equivalent emission gas total volume or a $CO_2$ equivalent emission gas total mass.

Advantageously, the volumetric flow rate or the mass flow rate of the $CO_2$ equivalent emission may be integrated over the predetermined elapsed time to derive respectively either a $CO_2$ equivalent emission gas total volume or a $CO_2$ equivalent emission gas total mass.

In an exemplary embodiment, in a further step, the overall $CO_2$ equivalent emission flow rate is represented numerically, graphically, or pictorially via a display in the vehicle.

Advantageously, the overall $CO_2$ equivalent emission flow rate can be viewed by the driver in real time.

Advantageously, the overall $CO_2$ equivalent emission flow rate can be consolidated and viewed over time such that the identified data and trends can be used to minimize cost or damage to the environment, for example, by helping the driver to choose the most efficient measures of operation of the vehicle for given set of engine and vehicle exhaust system conditions and environmental conditions.

In an exemplary embodiment, in a further step, the gas total volume or the gas total mass is represented numerically, graphically, or pictorially via a display in the vehicle.

Advantageously, the gas total volume or gas total mass data can be viewed by the driver in real time.

Advantageously, the gas total volume or gas total mass data can be consolidated and viewed over time such that data and trends indentified can be used to minimize cost or damage to the environment, for example, by helping the driver to choose the most efficient measures of operation of the vehicle for given set of engine and vehicle exhaust system conditions, and environmental conditions.

According to a second aspect of the present invention, there is provided a method of determining a vehicle efficiency factor (E) for a vehicle powered by an internal combustion engine, the engine powered by a fuel, the method comprising the steps:

determining a fuel chemical energy input (F), a change in the kinetic energy (K), a change in the potential energy (P), a magnitude of the aerodynamic frictional losses (A), a magnitude of the mechanical frictional losses (M), and a magnitude of braking frictional losses (B) of the vehicle over a predetermined time interval; and determining the vehicle efficiency factor (E) for the predetermined time interval based on a comparison between a total energy input and a total energy output, the total energy input including the fuel chemical energy input (F), and the total energy output including the change in kinetic energy (K), the change in potential energy (P), the aerodynamic frictional losses (A) and the mechanical frictional losses (M) of the vehicle.

Advantageously, the total energy input may also include other components such as a solar energy input component for vehicles with photovoltaic cells mounted on the exterior body work, or a battery energy input component associated with battery discharging for hybrid or electric vehicles.

Advantageously, the total energy output may also include other components such as an acoustic noise energy component, the energy component associated with engine accessories such as air conditioning compressors, power steering pumps and alternators, a battery energy output component associated with battery charging in hybrid or electric vehicles, and braking frictional losses (B) at the brakes of the vehicle.

In an exemplary embodiment, the comparison is a ratio between the total energy input and the total energy output.

In an exemplary embodiment, the ratio is $(K+P+A+M)/F$.

In an exemplary embodiment, the fuel chemical energy input (F) is based on fuel data and the quantity of fuel consumed by the engine and the fuel data is derived using mathematical calculation or reference to a lookup table.

In an exemplary embodiment, the fuel chemical energy input (F) is based on fuel data and the quantity of fuel consumed by the engine, and the fuel data is downloaded from the Internet based on one or more of the parameters fuel type, fuel origin, fuel blend factors, and fuel seasonal factors.

In an exemplary embodiment, the change in the kinetic energy (K) is based on the mass of the vehicle and the change in speed of the vehicle, and is derived using mathematical calculation or reference to a lookup table.

In an exemplary embodiment, the change in the potential energy (P) is based on the mass of the vehicle and the change in height of the vehicle, and is derived using mathematical calculation or reference to a lookup table.

In an exemplary embodiment, the magnitude of the aerodynamic frictional losses (A) is based on the air density, the speed of the vehicle, and an aerodynamic friction coefficient, and is derived using mathematical calculation or reference to a lookup table.

In an exemplary embodiment, the magnitude of the mechanical frictional losses (M) is based on the speed of the vehicle, the mass of the vehicle, and a mechanical friction coefficient, and is derived using mathematical calculation or reference to a lookup table.

In an exemplary embodiment, the change in height of the vehicle is determined based on the speed of the vehicle and data from a motion sensor fixed to the vehicle.

Advantageously, the motion sensor allows the change in height of the vehicle to be accurately determined in real time.

In an exemplary embodiment, the motion sensor comprises one or more of a single or multi-axis accelerometer, a mechanical or solid-state gyroscope, a GPS system, and a differential GPS system using a ground station.

In an exemplary embodiment, the magnitude of braking frictional losses (B) is determined based on change in kinetic energy (K) and change in potential energy (P) of the vehicle under braking conditions.

In an exemplary embodiment, the aerodynamic friction coefficient is updated in real time by the coast down method.

Advantageously, the aerodynamic friction coefficient is determined under actual operational conditions such as atmospheric turbulence for increased accuracy.

In an exemplary embodiment, the mechanical friction coefficient is updated in real time by the coast down method.

Advantageously, the mechanical friction coefficient is determined under actual operational conditions such as driving surface conditions for increased accuracy.

In an exemplary embodiment, the vehicle efficiency factor (E) is represented numerically, graphically, or pictorially via a display in the vehicle.

Advantageously, the vehicle efficiency factor (E) can be viewed by the driver in real time.

Advantageously, the vehicle efficiency factor (E) can be consolidated and viewed over time such that data and trends identified can be used to minimize cost or damage to the environment, for example, by helping the driver to choose the most efficient measures of operation of the vehicle for a given set of engine and environmental conditions.

In an exemplary embodiment, the method further comprises the step of generating energy-flow-visualization data for the predetermined time interval.

In an exemplary embodiment, the energy flow visualization data comprises information with regards to inter-conversion of one or more of the fuel chemical energy input (F), the change in kinetic energy (K), the change in potential energy (P), the aerodynamic frictional losses (A), and the mechanical frictional losses (M) of the vehicle over the predetermined time interval.

Advantageously, the energy flow visualization data gives a driver driving the vehicle information with regards to the inter-conversion of energy such as a negative change in potential energy (P) directly contributing to a positive change in kinetic energy (K) or a negative change in kinetic energy (K) directly contributing to a positive change in mechanical friction losses (M) at the end of each of the predetermined time interval. This is beneficial from the driver's perspective as it provides a mode of real time feedback of specific problem areas with respect to the driver's driving condition, for example, excessive repetitions of negative changes in kinetic energy (K) directly contributing to positive changes in mechanical friction losses (M) may indicate excessive braking during driving.

In an exemplary embodiment, the energy-flow-visualization data also comprises a measure of vehicle efficiency and a measure of braking frictional losses (B).

In an exemplary embodiment, the energy-flow-visualization data is represented numerically, graphically, or pictorially via a monochrome or color display in the vehicle.

Advantageously, the energy-flow-visualization data can be viewed by the driver in real time.

Advantageously, the energy-flow-visualization data can be consolidated and viewed over time such that data and trends indentified can be used to minimize cost or damage to the environment, for example, by helping the driver to choose the most efficient measures of operation of the vehicle for a given set of engine and environmental conditions.

Advantageously, the energy-flow-visualization data can be represented in the form of color or sound. This is beneficial because the information may be obtained by the driver through one or more senses not directly involved in the operation of the vehicle, such as peripheral vision or the sense of hearing.

In an exemplary embodiment, the vehicle efficiency factor (E) is recorded in the vehicle in real time and is used to statistically determine a vehicle efficiency map based on differing engine conditions, driving conditions, and environmental conditions.

Advantageously, the vehicle efficiency map may be derived from data logged during use of the vehicle over time or data preloaded for the specific vehicle and journey. This is beneficial because any influence on vehicle efficiency afforded by vehicle modifications such as roof racks, rear wings or body kits, wheel or tire types, engine accessories, or engine oils may be accounted for.

In an exemplary embodiment, the engine conditions include one or more of the values of engine RPM, ignition advance, intake manifold absolute pressure, torque, throttle position, coolant temperature, intake air temperature, engine vibration (knock), engine misfire data, fuel type, or fuel flow rate.

Advantageously, the vehicle efficiency factor (E) takes into account one or more of the values of engine RPM, ignition advance, intake manifold absolute pressure, torque, throttle position, coolant temperature, intake air temperature, engine vibration (knock), engine misfire data, fuel type, or fuel flow rate.

Advantageously, the engine conditions can be obtained from relevant sensors located within the vehicle via access to the engine or chassis serial communication bus (e.g., a Controller-Area Network bus or CAN bus) or the on-board diagnostics system.

In an exemplary embodiment, the driving conditions include one or more of the values of vehicle speed, longitudinal acceleration, vertical inclination angle, or lateral acceleration.

Advantageously, the vehicle efficiency factor (E) takes into account one or more of the values of vehicle speed, longitudinal acceleration, vertical inclination angle, or lateral acceleration.

In an exemplary embodiment, the environmental conditions include one or more of the values of barometric pressure, ambient air temperature, or other weather parameters.

Advantageously, the vehicle efficiency factor (E) takes into account one or more of the values of barometric pressure, ambient air temperature, or other weather parameters.

In an exemplary embodiment, the current value of the vehicle efficiency factor (E) is compared in real time to the corresponding point on the vehicle efficiency map based on at least one of current vehicle conditions, driving conditions, environmental conditions, and energy-flow-visualization data to derive a driver efficiency factor.

Advantageously, the driver efficiency factor is representative of the efficiency of the driver independent of external conditions such as environmental conditions.

Advantageously, the driver efficiency factor takes into account energy-flow-visualization data.

Advantageously, the driver efficiency factor for a driver driving a vehicle can be calculated, compared with statistically derived information, and fed back to the driver of the vehicle in real time. This is beneficial from the driver's perspective as the driver's driving performance can be monitored in real time such that the driver can adjust his/her driving condition in alignment with a more efficient driving condition. This is further beneficial to the driver as it provides a mode of training and assessment of the driver's skill level, and also provides a mode of guidance of the driver's progress towards becoming a more efficient driver of the vehicle.

In an exemplary embodiment, the driver efficiency factor is represented numerically, graphically, or pictorially via a monochrome or color display in the vehicle.

Advantageously, the driver efficiency factor can be viewed by the driver in real time.

Advantageously, the driver efficiency factor can be consolidated and viewed over time such that data and trends indentified can be used to minimize cost or damage to the environment, for example, by helping the driver to choose the most efficient measures of operation of the vehicle for a given set of engine and environmental conditions.

Advantageously, the driver efficiency factor can be represented in the form of color or sound. This is beneficial because the information may be obtained by the driver through one or more senses not directly involved in the operation of the vehicle, such as peripheral vision or the sense of hearing.

In an exemplary embodiment, the vehicle comprises a cruise control system, the cruise control system controlled based on maximization of the vehicle efficiency factor (E).

Advantageously, the driver has the option of utilizing the cruise control system to achieve maximum vehicle efficiency.

In an exemplary embodiment, the vehicle comprises a cruise control system, the cruise control system controlled based on maximization of the driver efficiency factor.

Advantageously, the driver has the option of utilizing the cruise control system to achieve maximum driver efficiency.

In an exemplary embodiment, the method of determining a vehicle efficiency factor further comprises displaying a vehicle efficiency value using color, wherein a first color indicates that the vehicle is being operated efficiently according to a first vehicle efficiency value and a second color indicates that the vehicle is being operated less efficiently according to a second vehicle efficiency value.

In an exemplary embodiment, the vehicle efficiency value corresponds to a driver efficiency factor.

In an exemplary embodiment, the vehicle efficiency value corresponds to a vehicle efficiency factor (E).

In an exemplary embodiment, the first color is green and the second color is red.

In an exemplary embodiment, one or more intermediate colors between the first color and the second color are used to represent the intermediate values between the first vehicle efficiency value to the second vehicle efficiency value.

In an exemplary embodiment, the vehicle efficiency value is displayed a global positioning system (GPS) device.

In an exemplary embodiment, the vehicle efficiency value is displayed in a portable digital assistant, such as smart phone.

In an exemplary embodiment, the energy-flow-visualization data is displayed.

In an exemplary embodiment, the energy-flow-visualization data is displayed in a global positioning system (GPS) device.

In an exemplary embodiment, the energy-flow-visualization data is displayed in a portable digital assistant, such as smart phone.

Advantageously, commonplace smart phones such as the Apple iPhone™ may be used to display the vehicle efficiency value. This removes the need to manufacture specialized display equipment by leveraging existing technology. Furthermore, smart phone device may be coupled by a wireless communication network, such as a Bluetooth™ or wireless Ethernet network, to obtain information from the relevant sensors in the vehicle.

In an exemplary embodiment, each of the fuel chemical energy input (F), the change in kinetic energy (K), and the change in potential energy (P) are illustrated as graphic volume elements interconnected by graphic connection elements, and energy flow is illustrated by a change in at least one characteristic of the graphic connection elements.

In an exemplary embodiment one or more of the aerodynamic frictional losses (A), the mechanical frictional losses (M), braking frictional loses (B), and other energy losses are illustrated as energy flow out of one or more of the graphic connection elements.

In an exemplary embodiment, the graphic volume elements represent absolute energy values, costs of the energy, or carbon or $CO_2$ mass equivalent of the energy.

In an exemplary embodiment, if an inefficiency is present with respect to the inter-conversion of energy from or to any one or more of fuel chemical energy (F), the change in kinetic energy (K) the change in potential energy (P), the aerodynamic frictional losses (A), the mechanical losses (M), and braking frictional losses (B) at least one characteristic of the graphic volume element is changed or at least one characteristic of one or more of the connecting graphic connection elements is changed.

According to another aspect, there is provided computer program code for calculating an emission flow rate of one or more $CO_2$ equivalent gases from an exhaust system of an internal combustion engine of a vehicle, the engine powered by a fuel and the exhaust system comprising a catalytic converter, the computer program code comprising computer executable instructions to cause a computing device to perform the steps of:
  receiving fuel data for the fuel;
  calculating an emissions factor for each of the one or more $CO_2$ equivalent gases;
  receiving engine data for the engine;
  receiving catalyst data for the catalyst;
  calculating a combustion factor for each of the one or more $CO_2$ equivalent gases; and
  calculating the emission flow rate for the one or more $CO_2$ equivalent gases based on the flow rate of the fuel to the engine and the respective emissions factor and the combustion factor.

In an exemplary embodiment, the $CO_2$ equivalent gas is $CO_2$ gas and the combustion factor is an oxidation factor.

In an exemplary embodiment, the $CO_2$ equivalent gas is $CH_4$, unburnt or partially burnt hydrocarbons (HC), CO, N2O or other nitrogen oxides (NOx), $SO_2$ or other sulfur oxides (SOx), or non-methane volatile organic compounds (NM-VOC), and the combustion factor is a vehicle factor.

In an exemplary embodiment, the engine data includes one or more of the measured values of air/fuel ratio, pre-catalyst oxygen sensor, engine RPM, ignition advance, torque, throttle position, coolant temperature, barometric pressure, intake air temperature, engine vibration (knock), and engine misfire data.

In an exemplary embodiment, the catalyst data includes a catalyst type and one or more of the measured values of catalyst temperature, age, poisoning factors, post-catalyst oxygen sensor, secondary air status flags, and catalyst malfunction flags.

In an exemplary embodiment, the computer executable instructions for receiving the fuel data further comprises computer executable instructions for receiving the fuel data from a lookup table.

In an exemplary embodiment, the computer executable instructions for receiving the fuel data further comprises computer executable instructions for receiving the relevant fuel data from the Internet according to one or more of the parameters: fuel type, fuel origin, fuel blend factors, and fuel seasonal factors.

In an exemplary embodiment, computer executable instructions for calculating the emissions factor further comprises computer executable instructions for calculating the emissions factor using a mathematical calculation according to the fuel data or a lookup table according to the fuel data.

In an exemplary embodiment, the computer program code further comprises computer executable instructions for calculating a pre-catalyst gas content value as a function of the fuel data, the engine data, and the emissions factor using a mathematical calculation or lookup table.

In an exemplary embodiment, the computer program code further comprises computer executable instructions for calculating a post-catalyst gas content value as a function of the respective pre-catalyst gas content value, the catalyst data and the fuel data using a mathematical calculation or lookup table.

In an exemplary embodiment, the computer executable instructions for calculating the combustion factor further comprises computer executable instructions for calculating the combustion factor as a function of the respective post-catalyst gas content value using a mathematical calculation or lookup table.

In an exemplary embodiment, the emission flow rate is a volumetric flow rate or a mass flow rate.

In an exemplary embodiment, the computer program code further comprises computer executable instructions for calculating the volumetric flow rate or the mass flow rate over a predetermined time interval to derive either a gas total volume or a gas total mass respectively.

In an exemplary embodiment, the computer program code further comprises computer executable instructions for calculating the combination of the emission flow rate for each of the one or more $CO_2$ equivalent gases to derive an overall $CO_2$ equivalent emission flow rate.

In an exemplary embodiment, the overall $CO_2$ equivalent emission flow rate is a volumetric flow rate or a mass flow rate.

In an exemplary embodiment, the computer program code further comprises computer executable instructions for calculating the volumetric flow rate or the mass flow rate of the overall $CO_2$ equivalent emission flow rate over a predetermined time interval to derive a $CO_2$ equivalent emission gas total volume or a $CO_2$ equivalent emission gas total mass respectively.

In an exemplary embodiment, the computer program code further comprises computer executable instructions for causing a display device to display the overall $CO_2$ equivalent emission flow rate numerically, graphically, or pictorially.

In an exemplary embodiment, the computer program code further comprises computer executable instructions for causing the display device to display the gas total volume or the gas total mass numerically, graphically, or pictorially via a display in the vehicle.

According to another aspect, there is provided a computer program code storage medium for calculating an emission flow rate of one or more $CO_2$ equivalent gases from an exhaust system of an internal combustion engine of a vehicle, the engine powered by a fuel and the exhaust system comprising a catalytic converter, the computer program code storage medium comprising computer program code as described above.

According to another aspect there is provided a device comprising:
a processor;
a display device operatively coupled to the processor; and
a computer program code storage medium as described above, the computer program code storage medium being operatively coupled to the processor.

According to another aspect there is provided a vehicle control system comprising:
a processor; and
a computer program code storage medium as described above, the computer program code storage medium being operatively coupled to the processor.

According to another aspect, there is provided a vehicle comprising a display and a vehicle control system as described above, the display being operatively coupled to the vehicle control system.

According to another aspect, there is provided computer program code for calculating a vehicle efficiency factor (E) for a vehicle powered by an internal combustion engine, the engine powered by a fuel, the computer program code comprising computer executable instructions to cause a computing device to perform the steps of:
receiving vehicle data;
calculating a fuel chemical energy input data (F), a change in the kinetic energy data (K), a change in the potential energy data (P), a magnitude of the aerodynamic frictional losses data (A), a magnitude of the mechanical frictional losses data (M), and a magnitude of braking frictional losses data (B) of the vehicle over a predetermined time interval as a function of the vehicle data; and
calculating the vehicle efficiency factor data (E) for the predetermined time interval as a function of at least one of a total energy input and a total energy output, the total energy input including the fuel chemical energy input data (F), and the total energy output including the change in kinetic energy data (K), the change in potential energy data (P), the aerodynamic frictional losses data (A) and the mechanical frictional losses data (M) of the vehicle.

In an exemplary embodiment, the function is a ratio between the total energy input and the total energy output.

In an exemplary embodiment, the ratio is $(K+P+A+M)/F$.

In an exemplary embodiment, the vehicle data comprises the quantity of fuel consumed by the engine, and the computer program code further comprises computer executable instructions for calculating the fuel chemical energy input data (F) as a function of fuel data and the quantity of fuel consumed by the engine, and computer executable instructions for calculating the fuel data using mathematical calculation or a lookup table.

In an exemplary embodiment, the vehicle data comprises quantity of fuel consumed by the engine, and the computer program code further comprises computer executable instructions for calculating the fuel chemical energy input data (F) as a function of fuel data and the quantity of fuel consumed by the engine, and computer executable instructions for receiving the fuel data from the Internet as a function of one or more of the parameters: fuel type, fuel origin, fuel blend factors, and fuel seasonal factors.

In an exemplary embodiment, the vehicle data comprises the mass of the vehicle and the change in speed of the vehicle, and the computer program code further comprises computer executable instructions for calculating the change in the kinetic energy data (K) as a function of the mass of the vehicle and the change in speed of the vehicle using a mathematical calculation or a lookup table.

In an exemplary embodiment, the vehicle data comprises the mass of the vehicle and the change in height of the vehicle, and the computer program code further comprises computer executable instructions for calculating the change in the potential energy data (P) as a function of the mass of the vehicle and the change in height of the vehicle using a mathematical calculation or a lookup table.

In an exemplary embodiment, the vehicle data comprises the air density, the speed of the vehicle, and an aerodynamic friction coefficient, and the computer program code further comprises computer executable instructions for calculating the aerodynamic frictional losses data (A) as a function of the air density, the speed of the vehicle, and an aerodynamic friction coefficient using mathematical calculation or lookup table.

In an exemplary embodiment, the vehicle data comprises the speed of the vehicle, the mass of the vehicle, and a mechanical friction coefficient, and the computer program code further comprises computer executable instructions for calculating the magnitude of the mechanical frictional losses data (M) as a function of the speed of the vehicle, the mass of the vehicle, and a mechanical friction coefficient using a mathematical calculation or lookup table.

In an exemplary embodiment, the computer program code further comprising computer executable instructions for calculating the change in height of the vehicle as a function of the speed of the vehicle and data from a motion sensor fixed to the vehicle.

In an exemplary embodiment, the vehicle data comprises change in kinetic energy data (K) and change in potential energy data (P) of the vehicle, and the computer program code further comprising computer executable instructions for calculating the magnitude of braking frictional losses data (B) as a function of change in kinetic energy data (K) and change in potential energy data (P) of the vehicle under braking conditions.

In an exemplary embodiment, the motion sensor comprises one or more of a single or multi-axis accelerometer, a mechanical or solid-state gyroscope, a GPS system, and a differential GPS system using a ground station.

In an exemplary embodiment, the computer program code further comprises computer executable instructions for calculating the aerodynamic friction coefficient in real time using a coast down method.

In an exemplary embodiment, the computer program code further comprises computer executable instructions for calculating the mechanical friction coefficient in real time using a coast down method.

In an exemplary embodiment, the computer program code further comprises computer executable instructions for causing a display device to display the vehicle efficiency factor (E) numerically, graphically, or pictorially via a display in the vehicle.

In an exemplary embodiment, the computer program further comprises computer executable instructions for calculating energy-flow-visualization data for the predetermined time interval.

In an exemplary embodiment, the computer program further comprises computer executable instructions for calculating energy-flow-visualization data comprising information with regards to inter-conversion of one or more of the fuel chemical energy input data (F), the change in kinetic energy data (K), the change in potential energy data (P), the aerodynamic frictional losses data (A), and the mechanical frictional losses data (M) of the vehicle over the predetermined time interval.

In an exemplary embodiment, the computer program code further comprises computer executable instructions for calculating the energy flow visualization comprising a measure of vehicle efficiency and a measure of braking frictional losses data (B).

In an exemplary embodiment, the computer program code further comprises computer executable instructions for causing a display device to display the energy-flow-visualization data numerically, graphically, or pictorially via a monochrome or color display in the vehicle.

In an exemplary embodiment, the computer program code further comprises computer executable instructions for storing the vehicle efficiency factor (E) in the vehicle in real time and computer executable instructions for statistically calculating a vehicle efficiency map based on differing engine conditions, driving conditions, and environmental conditions.

In an exemplary embodiment, the engine conditions include one or more of the values of engine RPM, ignition advance, intake manifold absolute pressure, torque, throttle position, coolant temperature, intake air temperature, engine vibration (knock), engine misfire data, fuel type, or fuel flow rate.

In an exemplary embodiment, the driving conditions include one or more of the values of vehicle speed, longitudinal acceleration, vertical inclination angle, or lateral acceleration.

In an exemplary embodiment, the environmental conditions include one or more of the values of barometric pressure, ambient air temperature, or other weather parameters.

In an exemplary embodiment, the computer program code further comprises computer executable instructions for calculating the current value of the vehicle efficiency factor (E) in real time, computer executable instructions for calculating a comparison data of the current value to the corresponding point on the vehicle efficiency map as a function of at least one of current vehicle conditions, driving conditions, environmental conditions and energy-flow-visualization data, and computer executable instructions for calculating a driver efficiency factor as a function of the comparison data.

In an exemplary embodiment, the computer program code further comprises computer executable instructions for causing a display device to display the driver efficiency factor numerically, graphically, or pictorially via a monochrome or color display in the vehicle.

In an exemplary embodiment, the vehicle comprises a cruise control system, and the computer program code further comprising computer executable instructions for controlling the cruise control system controlled as a function of maximization of the vehicle efficiency factor (E).

In an exemplary embodiment, the vehicle comprises a cruise control system, and the computer program code further comprising computer executable instructions for controlling the cruise control system controlled as a function of the maximization of maximization of the driver efficiency factor.

In an exemplary embodiment, the computer program code further comprises computer executable instructions for causing a display device to display a vehicle efficiency value using color, wherein a first color indicates that the vehicle is being operated efficiently according to a first vehicle efficiency value and a second color indicates that the vehicle is being operated less efficiently according to a second vehicle efficiency value.

In an exemplary embodiment, the vehicle efficiency value corresponds to a driver efficiency factor.

In an exemplary embodiment, the vehicle efficiency value corresponds to a vehicle efficiency factor (E).

In an exemplary embodiment, the first color is green and the second color is red.

In an exemplary embodiment, one or more intermediate colors between the first color and the second color are used to represent the intermediate values between the first vehicle efficiency value and the second vehicle efficiency value.

In an exemplary embodiment, the device is a global positioning system (GPS).

In an exemplary embodiment, the device is a portable digital assistant.

In an exemplary embodiment, the computer program code further comprises computer executable instructions for causing a display device to display the energy-flow-visualization data.

In an exemplary embodiment, the device is a global positioning system (GPS).

In an exemplary embodiment, the device is a portable digital assistant.

In an exemplary embodiment, the computer program code further comprises computer executable instructions for causing the display device to display each of the fuel chemical energy input data (F), the change in kinetic energy data (K), and the change in potential energy data (P) as graphic volume elements interconnected by graphic connection elements and computer executable instructions for causing the display device to display energy flow by a change in at least one characteristic of the graphic connection elements.

In an exemplary embodiment, the computer program code further comprises computer executable instructions for causing the display device to display one or more of the aerodynamic frictional losses data (A), the mechanical frictional losses data (M), the braking frictional losses data (B), and other energy losses as energy flow out of one or more of the graphic connection elements.

In an exemplary embodiment, the computer program code further comprises computer executable instructions for causing the display device to display the graphic volume elements representing absolute energy values, costs of the energy, or carbon or $CO_2$ mass equivalent of the energy.

In an exemplary embodiment, the computer program code further comprises computer executable instructions for causing the display device to display, if an inefficiency is present with respect to the inter-conversion of energy from or to any one or more of fuel chemical energy data (F), the change in kinetic energy data (K), the change in potential energy data (P), the aerodynamic frictional losses data (A), the mechanical losses data (M), and braking frictional losses data (B) and at least one characteristic of the graphic volume element is changed or at least one characteristic of one or more of the connecting graphic connection elements is changed.

According to another aspect, there is provided a computer program code storage medium for calculating a vehicle efficiency factor (E) for a vehicle powered by an internal combustion engine, the engine powered by a fuel, the computer program code storage medium comprising computer program code as described above.

According to another aspect, there is provided a device comprising:
 a processor;
 a display device operatively coupled to the processor; and
 a computer program code storage medium as described above, the computer program code storage medium being operatively coupled to the processor.

According to another aspect, there is provided a vehicle control system comprising:
 a processor; and
 a computer program code storage medium as described above, the computer program code storage medium being operatively coupled to the processor.

According to another aspect, there is provided a vehicle comprising a display and a vehicle control system as described above, the display being operatively connected to the vehicle control system.

It is important to note that the advantages of the above-described computer program code aspects of the invention are the same or substantially the same as the advantages of the corresponding above described method aspects of the invention. Other aspects of the invention are also disclosed.

Although the invention is illustrated and described herein as embodied in methods that determine and display exhaust emissions and efficiency of a vehicle, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
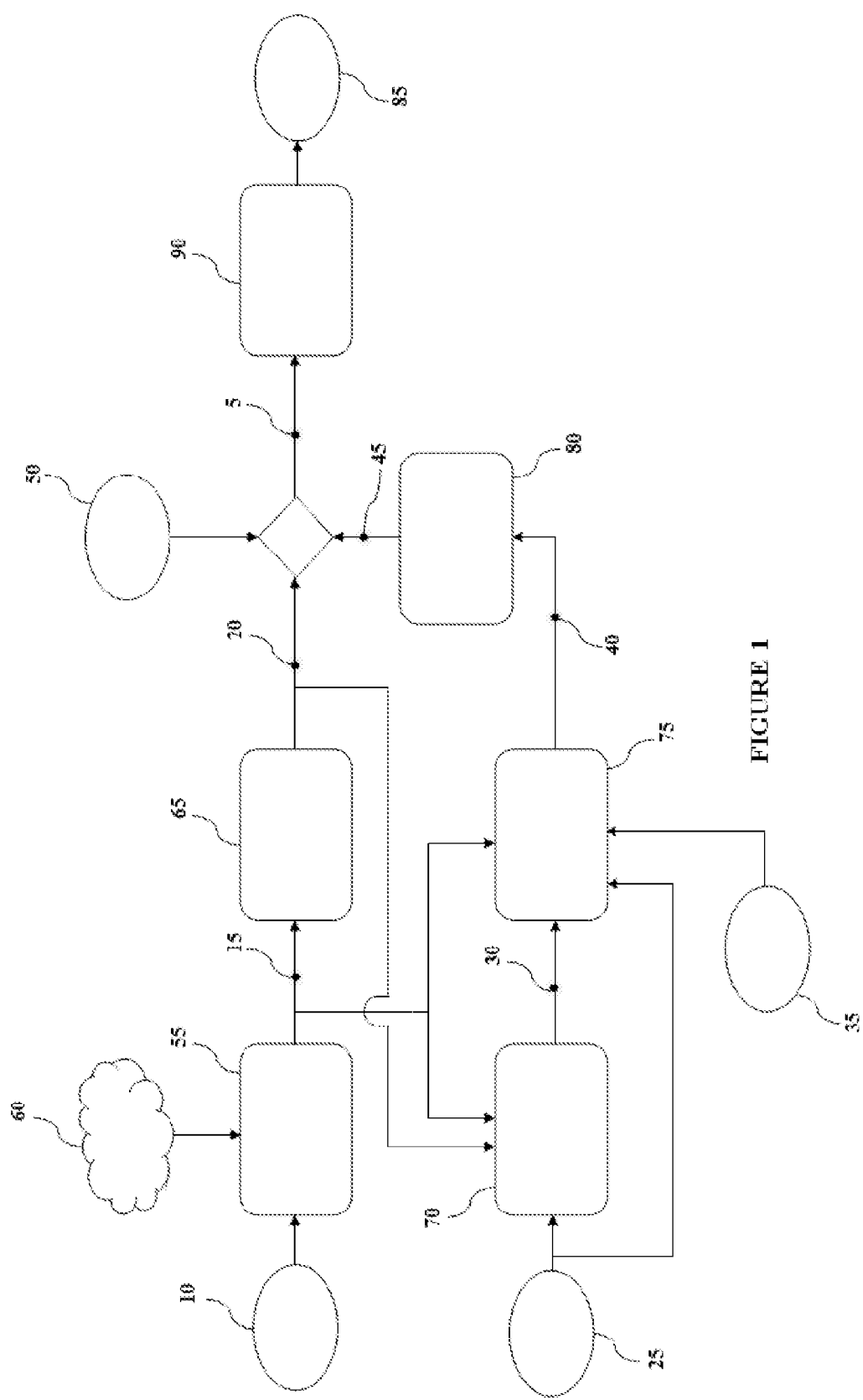
FIG. 1 is a schematic diagram of a method for determining an emission flow rate of one or more $CO_2$ equivalent gases from an exhaust system of an internal combustion engine of a vehicle in accordance with an exemplary embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software," "software application," and the like as used herein, are defined as a sequence of instructions designed for execution on a computer system. A "program," "software," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

It should be noted in the following description that like or the same reference numerals in different embodiments denote the same or similar features.

Described now are exemplary embodiments of the present invention. Referring now to the figures of the drawings in detail and first, particularly to FIG. 1, there is shown a first exemplary embodiment of a method is schematically shown whereby an emission flow rate 5 of one or more $CO_2$ equivalent gases from an exhaust system (not shown) of an internal combustion engine (not shown) of a vehicle (not shown) is determined, in which the engine is powered by a fuel 10 and the exhaust system comprises a catalytic converter (not shown). In this embodiment, the method comprises the following steps:

collecting fuel data 15 for the fuel 10;
collecting engine data 25 for the engine;
collecting catalyst data 35 for the catalyst;
generating a post-catalyst gas content value 40 for each of the one or more $CO_2$ equivalent gases;
generating a combustion factor 45 for each of the one or more $CO_2$ equivalent gases; and
generating the emission flow rate 5 for the one or more $CO_2$ equivalent gases based on the flow rate 50 of the fuel 10 and the respective emissions factor 20 and combustion factor 45.

It may be generally assumed that the ultimate goal of combustion within the internal combustion engine is to match each molecule of fuel 10 with a corresponding number of molecules of oxygen so that neither has any molecules remaining after combustion and after passing through the catalytic converter. Such a balanced condition is known as stoichiometry. During this balanced condition, the products of combustion and the corresponding emission flow rate 5 can be analytically derived. However, stoichiometry is not always achievable, resulting in a need for empirical determination of the emission flow rate 5.

In this embodiment, an emissions factor 20 and post-catalyst gas content value 40 are generated for each of the one or more $CO_2$ equivalent gases.

Although the largest part of most combustion gases is relatively harmless nitrogen ($N_2$), water vapor ($H_2O$), and carbon dioxide ($CO_2$), a relatively small part is undesirable noxious or toxic substances, such as carbon monoxide (CO), hydrocarbons, nitrogen oxides ($NO_x$), unburnt or partially burnt hydrocarbons (HC), and particulate matter. In this specification, including the claims, the phrase "$CO_2$ equivalent gases" is defined as meaning the gas $CO_2$ per se, non-$CO_2$ greenhouse gases such as $CH_4$ and $N_2O$, and also non-$CO_2$ gas pollutants that are not normally considered as greenhouse gases such as CO, $NO_x$ (excluding $N_2O$), NMVOC (non-methane volatile organic compounds), unburnt or partially burnt hydrocarbons (HC), and $SO_2$.

In this embodiment as herein described, the $CO_2$ equivalent gas is considered to be pure $CO_2$ gas, and the corresponding combustion factor 45 is best termed an "oxidation factor" (not shown) because the reaction product is a pure oxide.

In other embodiments, when the $CO_2$ equivalent gas is $CH_4$, unburnt or partially burnt hydrocarbons (HC), CO, $N_2O$ or other nitrogen oxides ($NO_x$), $SO_2$ or other sulfur oxides ($SO_x$), or non-methane volatile organic compounds (NMVOC), the combustion factor 45 is better termed a "vehicle factor" (not shown) because not all reaction products in this situation are oxides. HC and CO are typically produced during incomplete combustion of the fuel 10, for instance, combustion that takes place with a combustion efficiency of less than 100%. Incomplete combustion may occur due to, for example, incomplete mixing of gases or wall quenching effects occurring when the cylinder walls of the engine combustion chamber are at a lower temperature compared to the combustion mix. $NO_x$ is typically formed during combustion at very high temperatures such as, for example, in excess of 1,500° C., which results in thermal fixation of the nitrogen present in ambient air. Any sulfur present in the fuel may be oxidized to $SO_2$ (sulfur dioxide) or $SO_3$ (sulfur trioxide) in the engine combustion chamber. Any sulfur that is not completely oxidized in the engine combustion chamber is oxidized in the catalytic converter, i.e., $SO_2$ is further oxidized to $SO_3$. CO is a poisonous gas if inhaled and HC, $NO_x$, and the various sulfur oxides (generally denoted as $SO_x$) are sources of environmental problems such as acid rain, smog formation, global warming, or ozone thinning. It is therefore relevant in these above-mentioned other embodiments that the emissions take into account the content of $CH_4$, unburnt or partially burnt hydrocarbons (HC), CO, $N_2O$ or other nitrogen oxides ($NO_x$), $SO_2$ or other sulfur oxides ($SO_x$), or non-methane volatile organic compounds (NMVOC) in addition to $CO_2$.

In this exemplary embodiment, the method employs engine data 25, catalyst data 35 and fuel type 10 as inputs. This eliminates any inaccuracy that may arise due to non-stoichiometric conditions such as fuel 10 passing through the engine unburned and purged out the exhaust system as liquid or vapor or, on the other hand, leakage in the fuel system that causes evaporation of the fuel 10 to the surroundings. In this embodiment, the engine data 25 includes one or more of the measured values of air/fuel ratio, the pre-catalyst, or exhaust manifold, oxygen sensor, engine RPM, ignition advance, torque, throttle position, coolant temperature, barometric pressure, intake air temperature, and engine vibration (knock), and engine misfire data. Of course, it will be appreciated that the engine data 25 is not limited to the above-mentioned measured values and that other measured values are possible within the scope of the present invention. Incorporating engine data 25 into the method eliminates errors that may be present due to engine design. For example, increased valve overlap (the period of time during which an engine's intake valve and exhaust valve are simultaneously open) usually leads to a corresponding increase in the amount of fuel 10 that may pass through the engine unburned and purged out the exhaust system as liquid or vapor. Further, engine combustion efficiency may be affected by environmental conditions such as temperature, barometric pressure, and humidity because these conditions essentially affect the combustion of the air-fuel mixture. The stoichiometric point (an air/fuel ratio, by mass, of approximately 14.7 for gasoline) of the fuel 10 is characterized by a normalized air/fuel ratio (lambda) of 1.

$$\lambda = \frac{\text{Actual air/fuel ratio}}{\text{Stoichiometric air/fuel ratio}}$$

In some instances, the air/fuel ratio is expressed in an inverse form, specifically the inverse of the lambda value, termed the "equivalence ratio". In this specification, measurement of the air/fuel ratio or measurement of the air/fuel ratio data should also, equally, be considered as the measurement of the normalized air/fuel ratio (lambda) and/or the associated equivalence ratio, and the data relevant thereto. Modern spark ignition engines usually operate at an oscillating air/fuel ratio, close to a stoichiometric ratio (a lambda value of 1 and an equivalence value of 1), as a result of the use of a feedback lambda control in the engine control system. The exhaust gas may, therefore, contain modest amounts of oxygen (when lean of stoichiometry), or more substantial amounts of CO (when rich of stoichiometry). Engines may also be specifically produced as lean burn engines, with an operating range of air fuel ratio of 14.5 to 22. Diesel engines, alternatively, operate significantly leaner, with load controlled by the amount of fuel injected in a fairly constant quantity of air at constant speed, resulting in lower temperatures, for example, 100 to 700° C., and substantial amounts of oxygen in the diesel exhaust gas. For these reasons, incorporating engine data 25 into the method of this embodiment increases the accuracy of the emission flow rate 5.

In this embodiment, the engine data 25 can be directly obtained from relevant sensors (not shown) located within the vehicle without the need for additional external sensors. For example, the use of an automotive oxygen sensor (not shown) can help determine, in real time, the deviation, if any, of the air/fuel ratio of a combustion engine from the stoichiometric air/fuel mixture and express the deviation as a normalized measure independent of fuel type 10, for example, "lambda" or "equivalence ratio"; and obtain misfire data, if any.

In this embodiment, the catalyst data 35 includes the catalyst type and one or more of the measured values of catalyst temperature, catalyst age, catalyst poisoning factors, the post-catalyst oxygen sensor, secondary air status flags, and catalyst malfunction flags. It will be appreciated that the catalyst data 35 is not limited to the one or more measured values listed such that any type of catalyst data may be suitable within the scope of the present invention. Further, the one or more measured values may be determined by any suitable method. For example, one way to detect catalyst malfunction makes use of on-board diagnosis and comparison using one or more oxygen sensors located upstream and downstream of the catalyst. Because the ageing of the catalyst is typically accompanied by a loss of oxygen storage capability, such a comparison may be correlated to the age of the catalyst. A new catalyst used in conjunction with, for example, a two stage lambda closed loop control system or a linear lambda control system, exhibits extremely suppressed lambda amplitude of an almost constant air/fuel ratio value downstream of the catalyst due to catalyst storage. As the catalyst ages, the lambda amplitude of the exhaust gas correspondingly increases. This presents a possible way of measuring catalyst age and corresponding catalyst efficiency.

Incorporating catalyst data 35 into the method of this embodiment eliminates any errors that may be present due to the catalyst. For example, catalytic activity and catalyst ageing are highly sensitive to temperature. Prolonged catalyst exposure to high temperatures of, for example, above 850° C. (e.g., during engine idling after a prolonged period of full load running of the engine) is known to enhance the rate of degradation of the effective catalytic surface area. Such exposure is further known to enhance dispersion of catalytic promoters or stabilizers that results in a decrease in oxygen storage capability and a further decrease in catalytic activity. Normal catalytic activity is also dependent on multiple variables. For example, removal of $NO_x$ from the exhaust gas either at stoichiometric or lean air/fuel ratio conditions involves catalytic processes such as consumption of $NO_x$ by other reducing molecular species present in the exhaust gas, for example, CO, HC, or $H_2$. For these reasons, incorporating catalyst data 35 into the method of this embodiment increases the accuracy of the emission flow rate 5.

In an exemplary embodiment, the step of collecting the fuel data 15 is carried out by inputting of a fuel type 10, which may include, for example, gasoline, diesel, alcohols, blends or gaseous fuels to a lookup table 55 or, alternatively, downloading the relevant fuel data 15 from, for example, appropriate sources located on the Internet 60 based on the fuel type 10. Fuel 10 is typically supplied in many different formulations according to, for example, government regulations, performance requirements, seasonal climate changes or geographical factors. This results in corresponding variation in the molecular weight and composition of the fuel 10. Comparison of fuel data 15 derived from the lookup table 55 with relevant fuel data 15 derived from the Internet 60 based on the fuel type 10, reduces or eliminates errors with regards to the molecular weight and composition of the fuel 10.

In this exemplary embodiment, the step of generating the emissions factor 20 is based on the fuel data 15 and is derived using mathematical calculation or reference to empirical data stored in a lookup table 65. The step of generating the pre-catalyst gas content value 30 is based on the fuel data 15, the engine data 25, and the emissions factor 20 and is derived using mathematical calculation or reference to empirical data stored in a lookup table 70. Likewise, the step of generating the post-catalyst gas content value 40 is based on the respective pre-catalyst gas content value 30 and the catalyst data 35 and the fuel data 15, and derived using mathematical calculation or reference to empirical data stored in a lookup table 75.

In this embodiment, the step of generating the combustion factor 45 is based on the respective post-catalyst gas content value 40 and derived using mathematical calculation or reference to empirical data stored in a lookup table 80. Thus, this combustion factor 45 is based on the post-catalyst gas content value 40 that is, in turn, based in part on the pre-catalyst gas content value 30. In other less-preferred embodiments (not shown), the combustion factor 45 can be estimated directly from the fuel data 15, engine data 25, and catalyst data 35, and it is in this case not necessary to generate one or both of the pre-catalyst gas content value 30 and the post-catalyst gas content value 40.

In the exemplary embodiment, the emission flow rate 5 is continually generated in real time based on a fuel flow rate 50, the emissions factor 20, and the combustion factor 45. The exhaust system effectively acts as a control volume that allows determination of this emission flow rate 5. In an exemplary embodiment, the emission flow rate 5 is a volumetric flow rate (e.g., in liters/s) or a mass flow rate (e.g., in grams/s), and one of these rates is measured over a predetermined elapsed time with an integrator 90 to derive, respectively, either a gas total volume 85 (e.g., in liters) or a gas total mass 85 (e.g., in grams).

The emission flow rate 5 can be displayed numerically, graphically, or pictorially in the vehicle (not shown). It will be appreciated that the modes of display of the emission flow rate 5 are not limited to the above-mentioned modes and indeed any suitable mode of display may be possible within the scope of the present invention. The value of the emission flow rate 5 can be viewed by the driver in real time. Alternatively, the emission flow rate 5 can be consolidated and viewed over time such that the identified data and trends can be used to minimize cost or damage to the environment, for example, by helping the driver to choose the most efficient measures of operation of the vehicle for a given set of engine and vehicle exhaust system conditions, and environmental conditions.

Rather than, or in addition to, displaying the emission flow rate 5, the gas total volume 85 or the gas total mass 85 can also be displayed numerically, graphically, or pictorially in the vehicle. Again, it will be appreciated that the modes of display of the gas total volume 85 or the gas total mass 85 are not limited to the above-mentioned and indeed any suitable mode of display may be possible within the scope of the present invention. Again, the gas total volume 85 or the gas total mass 85 can be viewed by the driver in real time. Alternatively, the gas total volume 85 or the gas total mass 85 may be consolidated and viewed over time such that the identified data and trends can be used to minimize cost or damage to the environment, for example, by helping the driver to choose the most efficient measures of operation of the vehicle for a given set of engine and vehicle exhaust system conditions, and environmental conditions.

In another embodiment involving a further step in the exemplary method according to the present invention, the emission flow rate 5 for each of the one or more $CO_2$ equivalent gases can be combined, according to various respective weighting factors, to derive an overall $CO_2$ equivalent emission flow rate that takes into account the content of one or more of $CH_4$, unburnt or partially burnt hydrocarbons (HC), CO, $N_2O$ or other nitrogen oxides ($NO_x$), $SO_2$ or other sulfur oxides, or non-methane volatile organic compounds (NM-VOC), in addition to the actual $CO_2$. The respective weight factors are arranged to reflect the global warming potential (GWP) for the respective gases, which results in the overall $CO_2$ equivalent emission flow rate relating directly to the overall GWP of the emissions. In this exemplary embodiment, the exhaust system similarly acts as a control volume that allows determination of the overall $CO_2$ equivalent emission flow rate 5. Again, in an exemplary embodiment, the overall $CO_2$ equivalent emission flow rate 5 is a volumetric flow rate (e.g., in liter/s) or a mass flow rate (e.g., in grams/s), and one of these rates is measured over a predetermined elapsed time via the integrator 90 to derive, respectively, either a $CO_2$ equivalent emission gas total volume 85 (e.g., in liters) or a $CO_2$ equivalent emission gas total mass 85 (e.g., in grams).

Again, in this other exemplary embodiment, the overall $CO_2$ equivalent emission flow rate 5 can be displayed numerically, graphically, or pictorially in the vehicle. It will be appreciated that the modes of display of the overall $CO_2$ equivalent emission flow rate 5 are not limited to the above-mentioned and, indeed, any suitable mode of display may be possible within the scope of the present invention. In this other embodiment, the overall $CO_2$ equivalent emission flow rate 5 can be viewed by the driver in real time. Alternatively, the overall $CO_2$ equivalent emission flow rate 5 can be consolidated and viewed over time such that the identified data and trends can be used to minimize cost or damage to the environment, for example, by helping the driver to choose the most efficient measures of operation of the vehicle for a given set of engine and vehicle exhaust system conditions, and environmental conditions or used as a basis for real time carbon offsets.

Again in respect to this other embodiment, rather than, or in addition to, displaying the overall $CO_2$ equivalent emission flow rate 5, gas total volume 85 or the gas total mass 85 can be displayed numerically, graphically, or pictorially in the vehicle. Again, it will be appreciated that the modes of display of the gas total volume 85 or the gas total mass 85 are not limited to the above-mentioned modes such that any suitable mode of display may be possible within the scope of the present invention. The gas total volume 85 or the gas total mass 85 can be viewed by the driver in real time. Alternatively, the gas total volume 85 or the gas total mass 85 may be consolidated and viewed over time such that the identified data and trends can be used to minimize cost or damage to the environment, for example, by helping the driver to choose the most efficient measures of operation of the vehicle for a given set of engine and vehicle exhaust system conditions, and environmental conditions or used as a basis for real time carbon offsets.

The method for determining an emission flow rate 5 of one or more $CO_2$ equivalent gases from an exhaust system of an internal combustion engine of a vehicle, the engine powered by a fuel 10 and the exhaust system comprising a catalytic converter provides a number of advantages, including one or more of the following:

1. The emissions of one or more $CO_2$ equivalent gases from the exhaust system of a vehicle can be more accurately calculated in real time based on the real time monitoring of redox reactions occurring in relation to vehicle operation, both in the engine and in the catalytic converter. Accurate information on actual emissions from vehicles is crucial for assessing environmental impacts of air pollutions and for establishing the most cost effective ways of addressing the problem of air pollution from vehicles. From an individual perspective, this is beneficial as it enables vehicle owners or users measures to track the environmental footprint of their vehicle and to compare the emissions of the vehicle with standard emissions data from the vehicle manufacturer, fuel supplier or relevant monitoring bodies (e.g., government agencies). Based upon this comparison, the owner or user can optimize his/her driving performance or vehicle parameters to meet the emission standards. This is also beneficial as it allows incorporation of an interface for tracking and monitoring of carbon offsets, trading and credits, and gives, for example, a more accurate assessment of the cost of operating a vehicle or displaying the carbon neutral status of the vehicle.
2. The emissions can take into account the content of $CO_2$ in the exhaust gas.
3. The emissions can also, if required, take into account the content of one or more of $CH_4$, unburnt or partially burnt hydrocarbons (HC), CO, $N_2O$ or other nitrogen oxide ($NO_x$), $SO_2$ or other sulfur oxides ($SO_x$), or non-methane volatile organic compounds (NMVOC) in the exhaust gas.
4. The emissions take into account one or more of the measured values of air/fuel ratio, pre-catalyst oxygen sensor, engine RPM, ignition advance, torque, throttle position, coolant temperature, barometric pressure, intake air temperature, engine vibration (knock), and engine misfire data.
5. The engine data can be obtained from relevant sensors located within the vehicle such as the on-board diagnostics. For example, an oxygen sensor can help determine in real time the deviation, if any, of the air/fuel ratio of a combustion engine from the stoichiometric air/fuel mixture and express the deviation as a measure independent of fuel type such as "lambda" or "equivalence ratio", or obtain misfire data, if any.
6. The emissions take into account the catalyst type and one or more of the measured values of catalyst temperature, catalyst age, catalyst poisoning factors, post-catalyst oxygen sensor, secondary air status flags, and catalyst malfunction flags.
7. The catalyst data can be obtained from relevant sensors located within the vehicle, such as the on-board diagnostics. For example, one way to detect catalyst malfunction makes use of on-board diagnosis using an oxygen sensor located downstream of the catalyst. The aging of the catalyst is typically accompanied by a loss of oxygen storage capability. A new catalyst used in conjunction with, for example, a two stage lambda closed loop control system or a linear lambda control system exhibits extremely suppressed lambda amplitude of an almost constant air/fuel ratio value downstream of the catalyst. As the catalyst is aged, the lambda amplitude of the exhaust gas correspondingly increases, thereby presenting a possible way of measuring catalyst efficiency.
8. The emissions take into account the fuel type.
9. A comparison of fuel data derived from the lookup table with fuel data derived from, for example, the Internet allows the most accurate and current fuel data based on fuel type to be used.
10. The emissions factor is automatically generated in real time.
11. The pre-catalyst gas content value is automatically generated in real time.
12. The emissions take into account the pre-catalyst gas content value, the catalyst data and the fuel data.
13. The post-catalyst gas content value is automatically generated in real time.
14. The emissions take into account the post-catalyst gas content value.
15. The combustion factor is automatically generated in real time.
16. The exhaust system acts as a control volume that allows determination of the emission flow rate.
17. The volumetric flow rate or the mass flow rate may be input into an integrator and integrated over the predetermined elapsed time to derive, respectively, either a gas total volume or a gas total mass.
18. The overall $CO_2$ equivalent emission flow rate takes into account greenhouse gases other than $CO_2$ such as $CH_4$, unburnt or partially burnt hydrocarbons (HC), CO, $N_2O$ or other nitrogen oxide ($NO_x$), $SO_2$ or other sulfur oxides ($SO_x$), or non-methane volatile organic compounds (NMVOC).
19. The exhaust system acts as a control volume that allows determination of the overall $CO_2$ equivalent emission flow rate.
20. The volumetric flow rate or the mass flow rate of the $CO_2$ equivalent emission may be input into an integrator and integrated over the predetermined elapsed time to derive respectively either a $CO_2$ equivalent emission gas total volume or a $CO_2$ equivalent emission gas total mass.
21. The overall $CO_2$ equivalent emission flow rate can be viewed by the driver in real time.
22. The overall $CO_2$ equivalent emission flow rate can be consolidated and viewed over time such that the identified data and trends can be used to minimize cost or damage to the environment, for example, by helping the driver to choose the most efficient measures of operation of the vehicle for given set of engine and vehicle exhaust system conditions, and environmental conditions.
23. The gas total volume or gas total mass data can be viewed by the driver in real time.
24. The gas total volume or gas total mass data can be consolidated and viewed over time such that the data and trends identified can be used to minimize cost or damage to the environment, for example, by helping the driver to choose the most efficient measures of operation of the vehicle for a given set of engine and vehicle exhaust system conditions, and environmental conditions.

Figure 2:
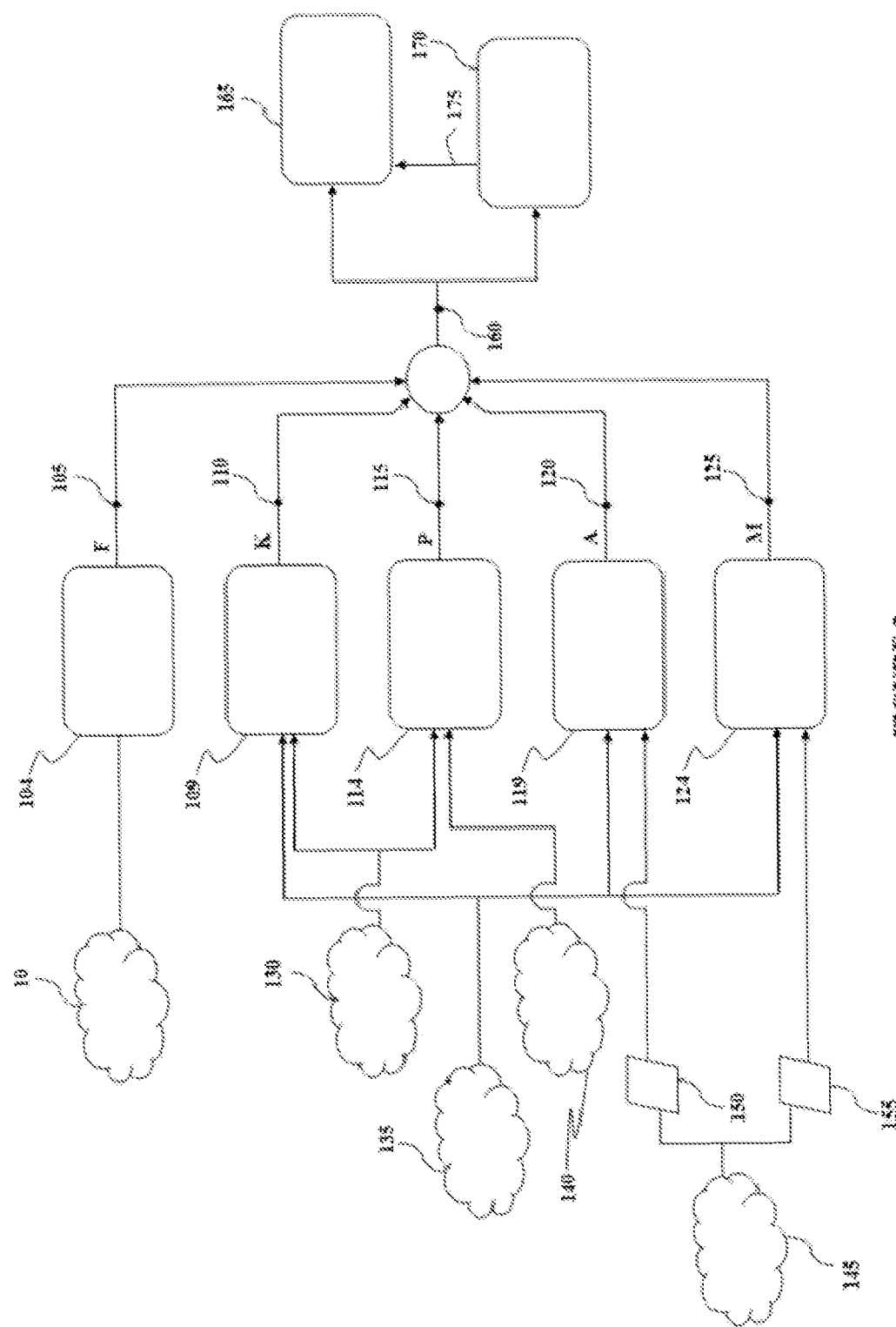
FIG. 2 is a schematic diagram of a method of determining and displaying a driver efficiency factor and a vehicle efficiency factor (E) for a vehicle powered by an internal combustion engine, the engine powered by a fuel, in accordance with another exemplary embodiment of the present invention.

Referring to FIG. 2, an exemplary embodiment of a method for determining and displaying a vehicle efficiency factor (E) 160 and a driver efficiency factor 175 for a vehicle (not shown) powered by an internal combustion engine (not shown) powered by a fuel 10 is schematically shown. In this embodiment, the method comprises the following steps:

determining a fuel chemical energy input (F) 105, a change in the kinetic energy (K) 110, a change in the potential energy (P) 115, a magnitude of the aerodynamic frictional losses (A) 120, and a magnitude of the mechanical frictional losses (M) 125 of the vehicle over a predetermined time interval; and determining the vehicle efficiency factor (E) 160 for the predetermined time interval based on a comparison between a total energy input and a total energy output, the total energy input including the fuel chemical energy input (F) 105, and the total energy output including the change in kinetic energy (K) 110, the change in potential energy (P) 115, the aerodynamic frictional losses (A) 120 and the mechanical frictional losses (M) 125 of the vehicle.

In this embodiment, the total energy input to the vehicle is the fuel chemical energy input (F) 105, while, in other embodiments, the total energy input could also include, for example, electrical energy generated by the discharge from a battery (e.g., in the case of a hybrid or electric vehicle) or solar energy (e.g., if photovoltaic cells are incorporated on the surface of the vehicle body work). Similarly, in this embodiment, the total energy output of the vehicle is kinetic energy (K) 110, potential energy (P) 115, aerodynamic frictional losses (A) 120 and mechanical frictional losses (M) 125 of the vehicle. In other embodiments, the total energy output may include the acoustic energy (for example, noise emanating from the vehicle), the energy consumed by the engine accessories including air conditioning system, power steering pump and alternator, the electrical energy used by the charge of a battery (for example, in the case of a hybrid or electric vehicle), and braking frictional losses (B) due to the heat dissipated when brakes (not shown) are applied to one or more of the wheels of the vehicle.

In an exemplary embodiment, the fuel chemical energy input (F) 105 is determined based on the type of fuel 10 and the quantity of fuel 10 consumed by the engine, and is derived using mathematical calculation or reference to a lookup table 104. The change in the kinetic energy (K) 110 is based on the mass 130 of the vehicle and the change in speed 135 of the vehicle, and derived using mathematical calculation or reference to a lookup table 109. The change in the potential energy (P) 115 is based on the mass 130 of the vehicle and the change in height of the vehicle 140, and is derived using mathematical calculation or reference to a lookup table 114. The magnitude of the aerodynamic frictional losses (A) 120 is based on the air density, the speed 135 of the vehicle, and an aerodynamic friction coefficient 150, and is derived using mathematical calculation or reference to a lookup table 119. The magnitude of the mechanical frictional losses (M) 125 is based on the speed 135 and mass 130 of the vehicle and a mechanical friction coefficient 155, and derived using mathematical calculation or reference to a lookup table 124.

In an exemplary embodiment, the change in height of the vehicle is based on the speed 135 of the vehicle and data from a motion sensor (not shown) fixed to or at least located within the vehicle. The motion sensor may take the form of any one of a number of motion sensors, including but not limited to any one or more of the following: single or multi-axis accelerometers; mechanical or solid state gyroscopes; global positioning systems (GPS); and differential GPS systems employing a local ground station. In this embodiment, the motion sensor is an accelerometer (not shown) used to determine the pitch (inclination from horizontal) of the driving surface. Information from the accelerometer can be compared with actual acceleration of the vehicle derived from the vehicles speed sensor to obtain the component of acceleration used to overcome the pitch of the driving surface. This component of acceleration then can be compared to a gravitational vector to obtain information regarding the pitch of the driving surface. The change in height of the vehicle can, in turn, be determined based on the pitch of the driving surface and the speed of the vehicle. The change in height of the vehicle can also be measured directly using standard commercially available GPS systems although, due to the presence of a dither signal, the position of the moving vehicle (including the vehicle height) is only accessible in real-time to an accuracy of 2 m or more. In a vehicle test environment where differential GPS is available, using a local fixed ground station and, hence, dither signal cancellation within a few kilometers of the ground station, the coordinates of a moving vehicle in 3-dimensional space (including height) can be measured in real-time to an accuracy of less than 20 mm.

In this embodiment, the aerodynamic friction coefficient 150 is updated by the coast down method 145. The coast down method 145 can be conducted automatically, in real time, during "no load" portions of the driving cycle. The coast down method 145 enables the aerodynamic friction coefficient 150 to be determined under actual operational conditions such as atmospheric turbulence for increased accuracy. In this embodiment, the mechanical friction coefficient 155 is also updated by the coast down method 145. The coast down method 145 further enables the mechanical friction coefficient 155 to be determined under actual operational conditions such as driving surface conditions for increased accuracy.

The vehicle efficiency factor (E) 160 or the driver efficiency factor 175 can be represented numerically, graphically, or pictorially via a monochrome or color display 165 in the vehicle. This allows the vehicle efficiency factor (E) 160 or the driver efficiency factor 175 to be viewed by the driver in real time such that immediate measures with regards to vehicle or driver efficiency improvements such as a gear change can be undertaken by the driver. For example, the use of color in the display can be used to highlight driving regimes in which the vehicle efficiency factor (E) 160 or the driver efficiency factor 175 is "high" (e.g., numbers or graphical/pictorial information highlighted in the color "green") compared to regions where it is "low" (for example numbers or the graphical/pictorial information highlighted in the color "red'). The vehicle efficiency factor (E) 160 or the driver efficiency factor 175 can also be consolidated and viewed over time such that the data and trends identified can be used to minimize cost or damage to the environment, for example, by helping the driver to choose the most efficient measures of operation of the vehicle for a given set of engine and environmental conditions.

The vehicle can further comprise a cruise control system (not shown) that is controlled based on maximization of the vehicle efficiency factor (E) 160 or the driver efficiency factor 175. This affords the driver the option of utilizing the cruise control system to achieve maximum vehicle or overall driving efficiency.

Figure 3:
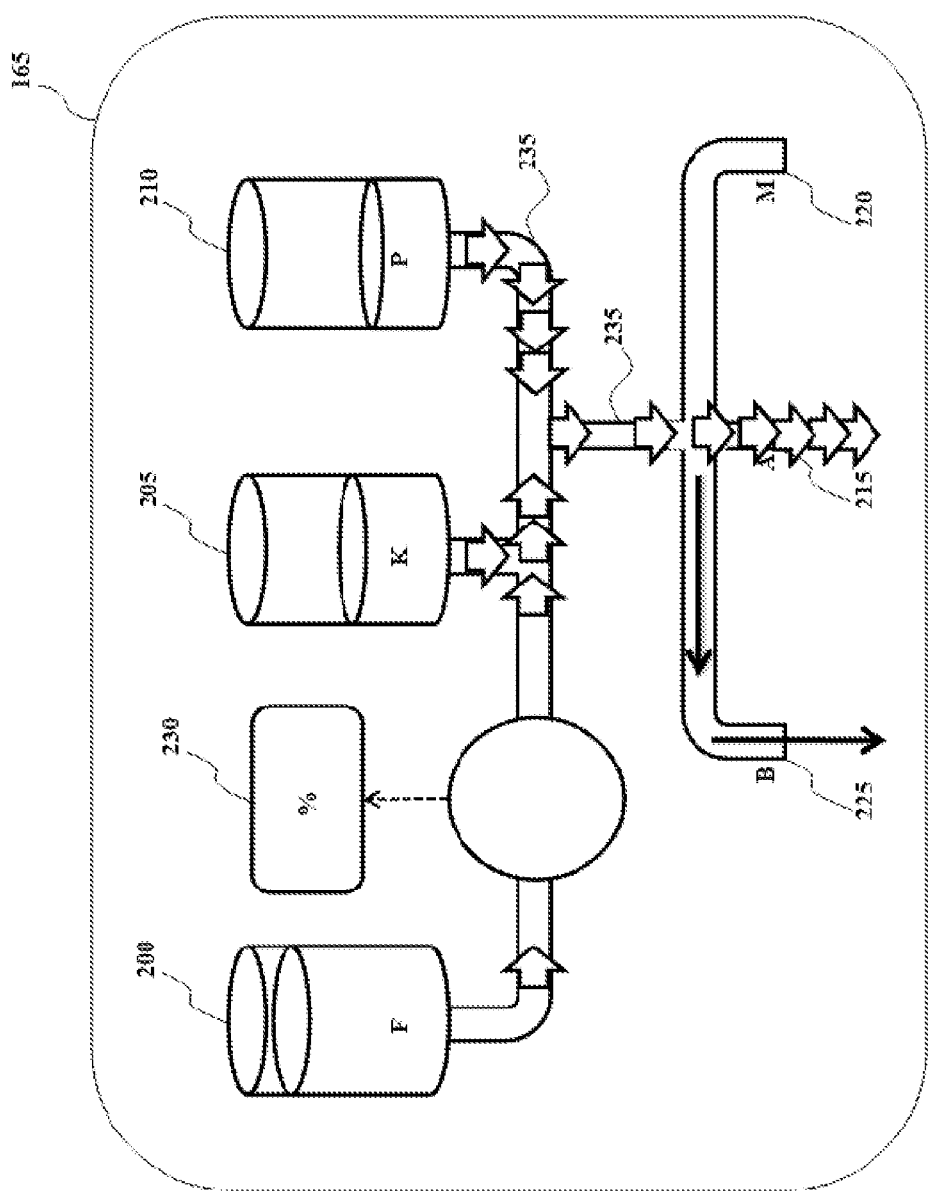
FIG. 3 is a configuration of a display pictorially representing energy-flow-visualization data in accordance with yet another embodiment of the present invention.

Referring now also to FIG. 3, the method according to another exemplary embodiment of the present invention can further comprise the generation of energy-flow-visualization data calculated over the predetermined time interval. The energy-flow-visualization data comprises information with regards to inter-conversion of one or more of the total energy inputs of the vehicle, for example the fuel chemical energy input (F) 105, and the one or more total energy outputs of the vehicle, for example, the change in kinetic energy (K) 110, the change in potential energy (P) 115, the aerodynamic frictional losses (A) 120, or the mechanical frictional losses (M) 125 of the vehicle over the predetermined time interval. The energy-flow-visualization data functions to give a driver information with regards to the inter-conversion of energy such as a negative change in potential energy (P) 115 directly contributing to a positive change in kinetic energy (K) 110, or a negative change in kinetic energy (K) 110 directly contributing to a positive change in mechanical friction losses (M) 125 during the predetermined time interval. This is beneficial from the driver's perspective as it provides a mode of real time feedback of specific problem areas with respect to the driver's driving condition, for example, excessive repetitions of negative changes in kinetic energy (K) 110 directly contributing to positive changes in mechanical friction losses (M) 125 may indicate excessive braking during driving. The "engine efficiency", for example, expressed as a percentage, may also be shown to express the overall % efficiency of fuel chemical energy conversion to useful mechanical energy by the engine.

The energy-flow-visualization data is represented numerically, graphically, or pictorially, and, in an exemplary embodiment, in color, via the display 165 in the vehicle. This allows the energy-flow-visualization data to be viewed by the driver in real time such that immediate improvements with regards to the driver's driving condition, such as a reduction in excessive braking and accelerating, can be undertaken by the driver. Color is used to highlight advantageous energy flows versus deleterious energy flows. The energy-flow-visualization data can also be consolidated and viewed over time such that data and trends identified can be used to minimize cost or damage to the environment, for example, by helping the driver to choose the most efficient measures of operation of the vehicle for a given set of engine and environmental conditions.

Referring once again to FIG. 3, in another exemplary embodiment, energy-flow-visualization data for indicating how efficiently a vehicle is being operated, is pictorially represented on display 165, the display 165 being adapted to display a color corresponding to a vehicle efficiency value such that the display 165 can display at least a first color when the vehicle is being operated according to a first vehicle efficiency value and a second color when the vehicle is being operated less efficiently according to a second vehicle efficiency value. In this embodiment, the vehicle efficiency value is determined using data from at least one or more of the following data sources: (i) a vehicle computer, such as, for example, an on-board diagnostics system; (ii) a vehicle motion sensor, such as, for example, a single or multi-axis accelerometer, a mechanical or solid state gyroscope, a GPS system, or a differential GPS system using a ground station; (iii) vehicle speed data 135; and (iv) global positioning system (GPS) data.

In this embodiment, the energy-flow-visualization data is represented pictorially in color in the form of graphic volume elements or energy reservoirs 200, 205 and 210 interconnected by a network of graphic connection elements or energy flow pipes 235, plus a numerical display of the vehicle efficiency value expressed as a percentage 230. In this embodiment, the level of "virtual fluid" in the energy reservoirs 200, 205 and 210 indicate absolute values of energy. However, in other embodiments (not shown), the level of "virtual fluid" in the energy reservoirs may alternatively indicate the quantum of energy measured over a predetermined interval of time (power), or any other "equivalent" representation of energy, for example, the dollar cost of the energy or the carbon or $CO_2$ equivalent mass of the energy. Similarly, the direction and rate of movement of the moving arrows shown in the network of energy flow pipes 235 indicate the direction and rate of flow of the energy (or other "equivalent" forms of the energy). The pictorial representation functions to dynamically display the inter-conversion of energy as a flow of energy that occurs between the energy reservoirs 200, 205 and 210 through the network of energy flow pipes 235. In this embodiment, the fuel chemical energy input (F) 105 is represented by reservoir 200, the change in kinetic energy (K) 110 and the change in potential energy (P) 115 are represented by reservoirs 205 and 210, respectively, and the energy associated with aerodynamic frictional losses (A) 120, the mechanical frictional losses (M) 125, and the braking frictional losses (B) are represented by pipe outlets 215, 220 and 225, respectively, which are indicated as energy "leaking" from the bottom of the network of energy flow pipes 235. This "leakage" energy, for example, may be visually shown as "drips of virtual liquid" (not shown) of variable drip-rate, depending on the rate of energy loss. In addition, the energy consumption/losses during periods of engine idling, where fuel chemical energy (F) is being consumed without necessarily producing a useful mechanical work output, can also be included as "leakage" energy in the energy flow visualization (not shown).

In an exemplary embodiment, the energy reservoirs 200, 205 and 210 represent absolute energy values, costs of the energy, or carbon or $CO_2$ mass equivalent of the energy. If an inefficiency is present with respect to the inter-conversion of fuel chemical energy input (F) 105 into the change in kinetic energy (K) 110 and the change in potential energy (P) 115, at least one characteristic of the energy reservoirs 200, 205 and 210 is changed or at least one characteristic of one or more of the connecting energy flow pipes 235 is changed.

As a simple example, when the change in height of the vehicle is decreasing and the speed of the vehicle is increasing during a downhill roll of the vehicle, the negative change in potential energy (P) 115 directly contributes to the positive change in kinetic energy (K) 110, and this is represented by a flow of energy from reservoir 210 to reservoir 205 through the connecting sections of energy flow pipes 235. Similarly, the "virtual liquid" level in reservoir 205 increases corresponding to an increase in kinetic energy (K) 110 and the "virtual liquid" level in reservoir 210 decreases corresponding to a decrease in potential energy (P) 115.

In this embodiment, when specific problem areas with respect to the driver's driving condition are detected, the corresponding part of the pictorial representation in FIG. 3 may be specifically highlighted, for example, by a change in color, to draw attention to the specific problem area. For example, during excessive braking, a large negative change in kinetic energy (K) 110 directly contributes to a large positive change in braking frictional losses (B), and this condition is highlighted by reservoir 205 and pipe outlet 225 and connecting sections of energy flow pipes 235 changing from a first color, for example, green to a second color, for example, red.

In the exemplary embodiment, the first color and second color are colors of the visible color spectrum. In this embodiment, the first color and second color may be any suitable pair of colors that are visually distinguishable, for example, the first color may be green and the second color may be red. When the vehicle efficiency value changes from the first vehicle efficiency value to the second vehicle efficiency value, this is represented by corresponding change of the first color to the second color, for example, from green to red. In an exemplary embodiment, the first color and second color are part of a color gradation such that when the vehicle efficiency value changes from the first vehicle efficiency value to the second vehicle efficiency value, the first color changes to the second color across the color gradation.

There is further provision for customization of the illumination colors to suit the driver's needs or personal preferences. For example, a red-green color-blind driver may prefer the "good" color to be light blue and the "bad" color to be brown.

In an exemplary embodiment, the display 165 is incorporated into a global positioning system (GPS) device that may be incorporated directly into the vehicle, for example, into the instrument panel (not shown) of the vehicle, or incorporated into the vehicle as a retrofit device (not shown), or incorporated (as an application) into a mobile device (not shown).

In an exemplary embodiment, the vehicle efficiency value corresponds to the driver efficiency factor 175. In another embodiment, the display 165 is further adapted to display the vehicle efficiency factor (E) 160.

In addition, the graphical representation in FIG. 3 may help to draw attention to other vehicle related issues. For example, if the engine is out of tune, the 'engine efficiency %' component, in the case of this embodiment, the numerical percentage display 230, may change color from the first color to a second color. If the vehicle has an under-inflated tire that was causing excessive mechanical rolling frictional losses, the mechanical frictional losses (M) area may change color from the first color to a second color to indicate that problem. Or, alternatively, if excessive energy was being lost to aerodynamic frictional losses (A), then that area of the display may change color from the first color to a second color. A clue to potential causes and solutions to these problems is effectively provided on the display. The visualization helps to make the driver aware of how his/her vehicle consumes, converts, and wastes energy, and how energy flow (interchange) and consumption (loss) is affected by extraneous factors such as roof racks, poor fuel, extra payloads, or low pressure in the tires. Over time, the display of the energy visualization data will effectively train the driver to become familiar with normal operation of his/her vehicle and recognize problems more readily.

In other embodiments (not shown), the energy-flow-visualization data may be represented in other forms. For example, the data may be represented as an audio output to an interior sound system (not shown) in the vehicle, or any other type of output or display that has the ability to deliver information to the driver through one or more of the driver's senses that are not directly involved in the driving task, such as peripheral vision or the sense of hearing may be employed.

In another embodiment, the vehicle efficiency factor 160 (E) can be also be recorded in the vehicle in real time and used to statistically determine a vehicle efficiency map 170 based on differing engine conditions (not shown), driving conditions (not shown), and environmental conditions (not shown). The engine conditions include one or more of the values of engine RPM, ignition advance, intake manifold absolute pressure, torque, throttle position, coolant temperature, intake air temperature, engine vibration (knock), engine misfire data, fuel type 10, or fuel flow rate. The driving conditions include one or more of the values of vehicle speed, longitudinal acceleration, vertical inclination angle, or lateral acceleration. The environmental conditions include one or more of the values of barometric pressure, ambient air temperature, or other weather parameters. The vehicle efficiency map 170 may be derived from data logged during use of the vehicle over time or data preloaded for the specific vehicle and journey. This allows any influence on vehicle efficiency afforded by vehicle modifications such as roof racks, rear wings or body kits, wheel or tire types, engine accessories, or engine oils to be accounted for.

In this other embodiment, the current value of the vehicle efficiency factor (E) 160 can be compared in real time to the corresponding point on the vehicle efficiency map 170 based on current vehicle conditions, driving conditions, and environmental conditions to derive a driver efficiency factor 175. The driver efficiency factor 175 gives an indication of the driver's driving efficiency that is independent of external conditions such as environmental conditions. The driver efficiency factor 175 for the driver driving a vehicle can be calculated, compared with statistically derived information, and fed back to the driver of the vehicle in real time. This is beneficial from the driver's perspective as his/her driving performance can be monitored in real time such that the driver can adjust their driving condition in alignment with a more efficient driving condition. This is further beneficial to the driver as it provides a mode of training and assessment of the driver's skill level and a mode of guidance of the driver's progress towards becoming a more efficient driver of the vehicle.

The driver efficiency factor 175 is represented numerically, graphically, or pictorially through a color display 165 in the vehicle. In an exemplary embodiment, the color display 165 takes the form of a color transition panel that has the ability to change colors in response to changes in the driver efficiency factor 175 so as to provide a corresponding indication of the driver's driving efficiency. The color transition panel may be a feature of a retrofit device (not shown), may be incorporated into the instrument panel (not shown) of the vehicle or may be incorporated into a mobile device (not shown). The color transition panel can be configured to have the ability to exhibit a gradual color change (through, for example the visual color spectrum) to indicate corresponding gradual improvement or decline of the driver efficiency factor 175. As in the previously mentioned display of the energy visualization data, there can also be provision for customization of the transition colors to suit the driver's needs or personal preferences. Also, as before, in other embodiments (not shown), the driver efficiency factor 175 may be represented in the form of an audio output or any other type of output or display that has the ability to deliver information to the driver through one or more or the driver's senses that are not directly involved in the driving task, such as peripheral vision or the sense of hearing.

The method of determining a vehicle efficiency factor (E) 160 for a vehicle powered by an internal combustion engine, the engine powered by a fuel, provides a number of advantages, including:

1. The motion sensor allows the change in height (vertical displacement) of vehicle to be accurately determined in real time.
2. The aerodynamic friction coefficient is determined under actual operational conditions such as atmospheric turbulence for increased accuracy
3. The mechanical friction coefficient is determined under actual operational conditions such as driving surface conditions for increased accuracy.
4. The vehicle efficiency factor (E) can be viewed by the driver in real time.
5. The vehicle efficiency factor (E) can be consolidated and viewed over time such that data and trends indentified can be used to minimize cost or damage to the environment, for example, by helping the driver to choose the most efficient measures of operation of the vehicle for a given set of engine and environmental conditions.
6. The driver has the option of utilizing the cruise control system that operates with maximum vehicle efficiency.
7. The energy-flow-visualization data gives a driver driving the vehicle information with regards to the inter-conversion of energy such as a negative change in potential energy (P) directly contributing to a positive change in kinetic energy (K) or a negative change in kinetic energy (K) directly contributing to a positive change in braking frictional losses (B) and/or other frictional losses at the end of each of the predetermined time intervals. This is beneficial from the driver's perspective as it provides a mode of real time feedback of specific problem areas with respect to the driver's driving condition, for example, excessive repetitions of negative changes in kinetic energy directly contributing to positive changes in braking frictional losses (B) may indicate excessive braking during driving.

8. The energy-flow-visualization data can be viewed by the driver in real time.

9. The energy-flow-visualization data can be consolidated and viewed over time such that data and trends indentified can be used to minimize cost or damage to the environment, for example, by helping the driver to choose the most efficient measures of operation of the vehicle for a given set of engine and environmental conditions.

10. The energy-flow-visualization data can be represented in the form of color or sound. This is beneficial because the information may be obtained by the driver through one or more senses not directly involved in the driving task, such as peripheral vision or the sense of hearing.

11. The vehicle efficiency map may be derived from data logged during use of the vehicle over time or data pre-loaded for the specific vehicle and journey. This is beneficial because any influence on vehicle efficiency afforded by vehicle modifications such as roof racks, rear wings or body kits, wheel or tire types, engine accessories, or engine oils may be accounted for.

12. The vehicle efficiency factor (E) takes into account one or more of the values of engine RPM, ignition advance, intake manifold absolute pressure, torque, throttle position, coolant temperature, intake air temperature, engine vibration (knock), engine misfire data, fuel type, or fuel flow rate.

13. The engine conditions can be obtained from relevant sensors located within the vehicle such as by access to the engine or chassis serial communications bus (e.g., a Controller-Area Network bus or CAN bus) or the on-board engine diagnostics system.

14. The vehicle efficiency factor (E) takes into account one or more of the values of vehicle speed, longitudinal acceleration, vertical inclination angle, or lateral acceleration.

15. The vehicle efficiency factor (E) takes into account one or more of the values of barometric pressure, ambient air temperature or other weather parameters.

16. The driver efficiency factor is representative of the efficiency of the driver independent of external conditions such as environmental conditions.

17. The driver efficiency factor for a driver driving a vehicle can be calculated, compared with statistically derived information, and fed back to the driver of the vehicle in real time. This is beneficial from the driver's perspective as the driver's driving performance can be monitored in real time such that the driver can adjust their driving condition in alignment with a more efficient driving condition. This is further beneficial to the driver as it provides a mode of training and assessment of the driver's skill level and a mode of guidance of the driver's progress toward becoming a more efficient driver of the vehicle.

18. The driver efficiency factor can be viewed by the driver in real time.

19. The driver efficiency factor can be consolidated and viewed over time such that the data and trends identified can be used to minimize cost or damage to the environment, for example, by helping the driver to choose the most efficient measures of operation of the vehicle for a given set of engine and environmental conditions.

20. The driver efficiency factor can be represented in the form of color or sound. This is beneficial because the information may be obtained by the driver through one or more senses not directly involved in the operation of the vehicle, such as peripheral vision or the sense of hearing.

Figure 4:
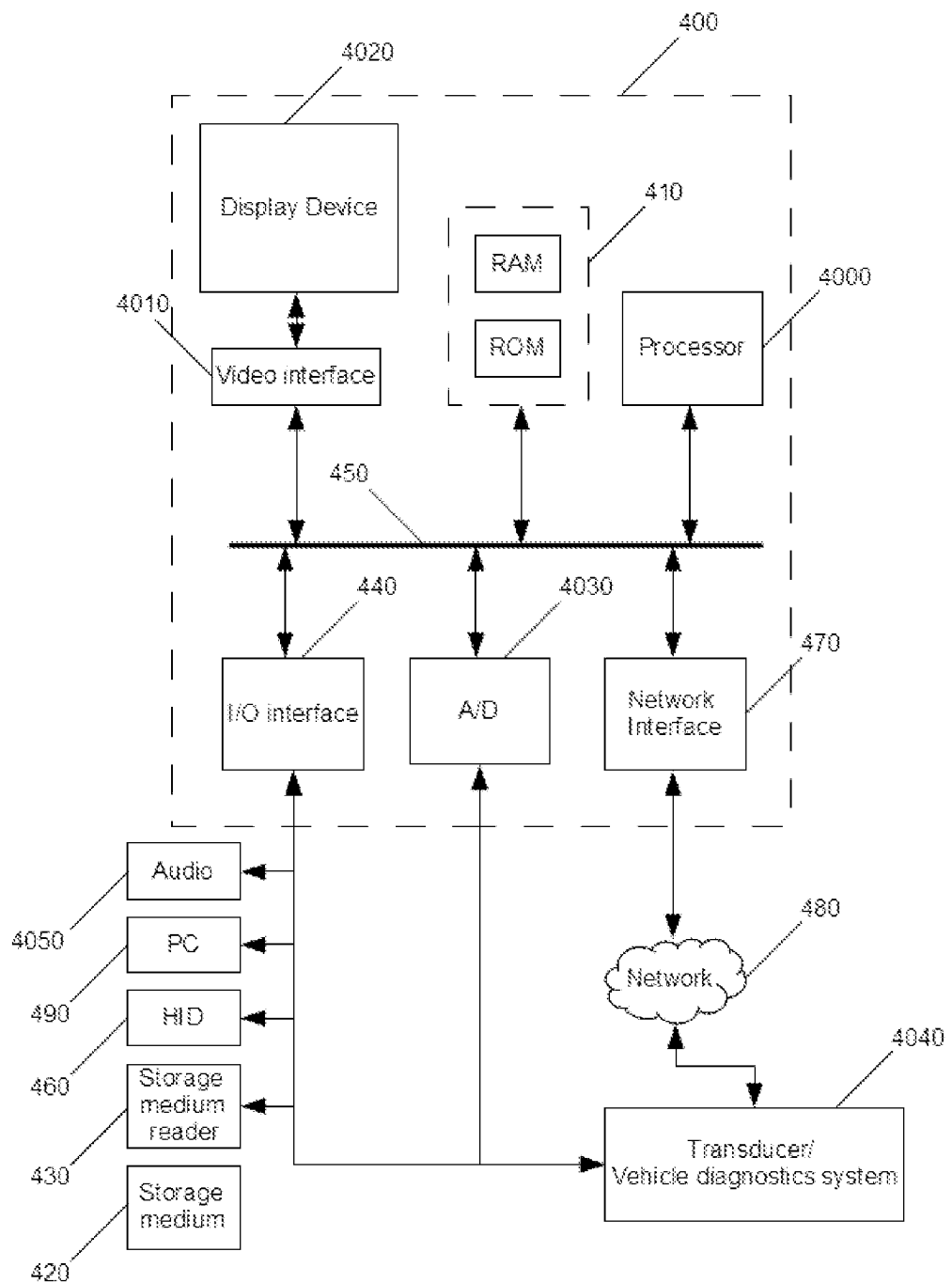
FIG. 4 is a schematic diagram of a general-purpose embedded controller in accordance with an exemplary embodiment of the present invention.

FIG. 4 shows a general-purpose embedded controller 400 on which the various embodiments described herein may be implemented. In one embodiment, the controller 400 is operable to determine an emission flow rate of one or more $CO_2$ equivalent gases from an exhaust system of an internal combustion engine of a vehicle as described above. In another embodiment, the controller 400 is operable to determining a vehicle efficiency factor (E) for a vehicle powered by an internal combustion engine as described above. The controller 400 is additionally operable to perform other methods and functions as described herein.

The controller 400 may take the form of a stand-alone device configured for mounting in the vehicle. The stand-alone device may be further configured for coupling to a vehicle diagnostic port for the purpose of obtaining vehicle and engine data.

In another embodiment, the controller 400 may be a generic device such as a GPS unit or portable digital assistant operable to perform the methods and functions described herein. In this embodiment, the generic device may be provided with computer program code for performing the methods and functions described herein.

In a further embodiment, the controller 400 may be a vehicle control system. Typically, the vehicle control system is installed into the vehicle during manufacture. As such, the vehicle control system may be provided with computer program code for performing the methods and functions described herein. As such, the vehicle may comprise the vehicle control system and display device operatively coupled to the vehicle control system.

The controller 400 comprises memory 410 that may comprise volatile memory (RAM) and/or non-volatile memory (ROM). Typically, the memory 410 comprises a combination of volatile and non-volatile memory, such that the non-volatile memory stores the controller 400 firmware and the volatile memory stores one or more temporary results of the fetch-decode-execute cycle, as described below.

The controller 400 comprises a computer program code storage medium reader 430 for reading data from a computer program code storage medium 420. The storage medium 420 may be optical media such as CD-ROM disks, magnetic media such as floppy disks and tape cassettes, or flash media such as USB memory sticks.

The I/O interface 440 communicates with the storage medium reader 430 and may take the form of a SCSI, USB, or similar interface. The I/O interface 440 may also communicate with one or more human input devices (HID) 460 such as a keyboard or pointing devices. The I/O interface 440 may also communicate with one or more personal computer (PC) devices 490, using a suitable interface such as an RS-232 interface. The I/O interface may also communicate audio signals to one or more audio devices 4050, such as a speaker or a buzzer.

The controller 400 also comprises a network interface 470 for communicating with one or more computer networks 480. Network 480 may be a wired network, such as a wired Ethernet network, or a wireless network, such as a Bluetooth™ network or IEEE 802.11 network. The network 480 may be a local area, such as a vehicle network, or a wide area network, such as the Internet.

Typically, computer program code is preloaded into the memory 400. However, computer program code instructions may be loaded into the memory 410 from the storage medium 420 using the storage medium reader 430 or from the network 480.

The controller 400 comprises an arithmetic logic unit or processor 4000 for performing computer program code instructions. The processor 4000 is typically a low-power microprocessor suited to low-power embedded controller applications. During the bootstrap phase, an operating system and one or more software applications are loaded the memory 410. During the fetch-decode-execute cycle, the processor 4000 fetches computer program code instructions from memory 410, decodes the instructions into machine code, executes the instructions, and stores the results in the memory 410.

The controller 400 also comprises a video interface 4010 for conveying video signals to a display device 4020, such as a liquid crystal display (LCD), cathode-ray tube (CRT), or similar display device. The display device 4020 may be embedded in the controller 400 or located at a remotely.

As described herein, the display device 4020 may display any of, or combination, of the following, numerically, graphically, or pictorially:
- the gas total volume or the gas total mass;
- the vehicle efficiency factor (E);
- the energy-flow-visualization data;
- the driver efficiency factor; and
- the overall $CO_2$ equivalent emission flow rate.

The controller further comprises one or more transducers 4040 for measuring one or more vehicle data, such as the quantity of fuel consumed by the engine, the mass of the vehicle, the change in speed of the vehicle, the change in height of the vehicle, the air density, the speed of the vehicle, an aerodynamic friction coefficient, a mechanical friction coefficient, change in kinetic energy (K), and change in potential energy (P) of the vehicle. As such, the transducer 4040 may take the form of a single or multi-axis accelerometer, a mechanical or solid-state gyroscope, a GPS system, and a differential GPS system using a ground station.

In alternative embodiments, the transducer 4040 may read data from of the on-board diagnostics system of the vehicle to obtain engine data. For instance, as described herein, an oxygen sensor in the on-board diagnostics system can help determine in real time the deviation, if any, of the air/fuel ratio of a combustion engine from the stoichiometric air/fuel mixture and express the deviation as a measure independent of fuel type such as "lambda" or "equivalence ratio", or obtain misfire data, if any.

The controller 400 further comprises an analog to digital (A/D) converter 4030 for converting analog signals from transducer 4040 into a digital format. The network 480 may be used to communicate vehicle and engine data from the transducer 4040 or the vehicle diagnostics system to the controller 400. For example, where the methods and functions described herein are performed by computer program code executable on a generic device, such as a portable digital assistant, the portable digital assistant may receive the vehicle and engine data across, for example, a wireless Ethernet network. In alternative embodiments, the vehicle and engine data may be communicated directly to the I/O interface 440 of the controller.

The controller 400 also comprises a communication bus 450 for interconnecting the various devices described above.

In one embodiment, the computer program code storage medium 420 comprises computer program code for calculating an emission flow rate 5 of one or more $CO_2$ equivalent gases from the exhaust system of the internal combustion engine of the vehicle. The computer program code comprises computer executable instructions to cause the controller 400 to receive fuel data 15 for the fuel 10, calculate an emissions factor 20 for each of the one or more $CO_2$ equivalent gases, receive engine data 25 for the engine, receive catalyst data 35 for the catalyst, calculate the combustion factor 45 for each of the one or more $CO_2$ equivalent gases, and calculate the emission flow rate 5 for the one or more $CO_2$ equivalent gases based on the flow rate of the fuel 10 to the engine and the respective emissions factor 20 and the combustion factor 45.

In this embodiment, the $CO_2$ equivalent gas is $CO_2$ gas and the combustion factor 45 is an oxidation factor, the $CO_2$ equivalent gas is $CH_4$, unburnt or partially burnt hydrocarbons (HC), CO, $N_2O$ or other nitrogen oxides (NOx), $SO_2$ or other sulfur oxides ($SO_x$), or non-methane volatile organic compounds (NMVOC), and the combustion factor 45 is the vehicle factor. The engine data 25 includes one or more of the measured values of air/fuel ratio, pre-catalyst oxygen sensor, engine RPM, ignition advance, torque, throttle position, coolant temperature, barometric pressure, intake air temperature, engine vibration (knock), and engine misfire data. The catalyst data 35 includes a catalyst type and one or more of the measured values of catalyst temperature, age, poisoning factors, post-catalyst oxygen sensor, secondary air status flags, and catalyst malfunction flags.

Furthermore, the computer executable instructions for receiving the fuel data 15 further comprises computer executable instructions for receiving the fuel data 15 from a lookup table 55 or receiving the relevant fuel data 15 from the Internet 60 according to one or more of the parameters: fuel type; fuel origin; fuel blend factors; and fuel seasonal factors. Also, the computer executable instructions for calculating the emissions factor 20 comprises computer executable instructions for calculating the emissions factor 20 using a mathematical calculation according to the fuel data 15 or a lookup table 55 according to the fuel data 15 and computer executable instructions for calculating a pre-catalyst gas content value as a function of the fuel data, the engine data 25, and the emissions factor 20 using a mathematical calculation or lookup table.

Further, the computer program code further comprises computer executable instructions for calculating a post-catalyst gas content value 40 as a function of the respective pre-catalyst gas content value, the catalyst data 35, and the fuel data 15 using a mathematical calculation or lookup table. The computer executable instructions for calculating the combustion factor 45 further comprises computer executable instructions for calculating the combustion factor 45 as a function of the respective post-catalyst gas content value 40 using a mathematical calculation or lookup table. The emission flow rate 5 is a volumetric flow rate or a mass flow rate.

Further still, the computer program code further comprises computer executable instructions for calculating the volumetric flow rate or the mass flow rate over a predetermined time interval to derive either a gas total volume or a gas total mass respectively. The computer program code further comprises computer executable instructions for calculating the combination of the emission flow rate 5 for each of the one or more $CO_2$ equivalent gases to derive an overall $CO_2$ equivalent emission flow rate.

Yet further, the overall $CO_2$ equivalent emission flow rate 5 is a volumetric flow rate or a mass flow rate.

Further, the computer program code further comprises computer executable instructions for calculating the volumetric flow rate or the mass flow rate of the overall $CO_2$ equivalent emission flow rate 5 over a predetermined time interval to derive a $CO_2$ equivalent emission gas total volume or a $CO_2$ equivalent emission gas total mass respectively. The computer program code further comprises computer executable instructions for causing a display device to display the overall $CO_2$ equivalent emission flow rate 5 numerically, graphically, or pictorially. The computer program code further comprises computer executable instructions for causing the display device to display the gas total volume or the gas total mass numerically, graphically, or pictorially via a display in the vehicle.

In another embodiment, the computer program code storage medium 420 comprises the computer program code.

In one embodiment, a device comprises a processor, a display device operatively coupled to the processor, and a computer program code storage medium 420 as described above, the computer program code storage medium 420 being operatively coupled to the processor.

In a further embodiment, the vehicle control system comprises a processor and a computer program code storage medium 420 as described above, the computer program code storage medium 420 being operatively coupled to the processor.

In another embodiment, the vehicle comprises a display and the vehicle control system as described above, the display being operatively coupled to the vehicle control system.

In a yet further embodiment, there is provided computer program code for calculating the vehicle efficiency factor (E) for the vehicle powered by an internal combustion engine, the engine powered by a fuel, the computer program code comprising computer executable instructions to cause the controller 400 to perform the steps of receiving vehicle data, calculating a fuel chemical energy input data (F), a change in the kinetic energy data (K), a change in the potential energy data (P), a magnitude of the aerodynamic frictional losses data (A), a magnitude of the mechanical frictional losses data (M), and a magnitude of braking frictional losses data (B) of the vehicle over a predetermined time interval as a function of the vehicle data, and calculating the vehicle efficiency factor data (E) for the predetermined time interval as a function of at least one of a total energy input and a total energy output, the total energy input including the fuel chemical energy input data (F), and the total energy output including the change in kinetic energy data (K), the change in potential energy data (P), the aerodynamic frictional losses data (A), and the mechanical frictional losses data (M) of the vehicle.

In this embodiment, the function is a ratio between the total energy input and the total energy output and the ratio is (K+P+A+M)/F.

Further, the vehicle data may comprise the quantity of fuel consumed by the engine, and the computer program code further comprises computer executable instructions for calculating the fuel chemical energy input data (F) as a function of fuel data 15 and the quantity of fuel 10 consumed by the engine and computer executable instructions for calculating the fuel data 15 using mathematical calculation or a lookup table.

Further still, the vehicle data may comprise a quantity of fuel 10 consumed by the engine and the computer program code further comprises computer executable instructions for calculating the fuel chemical energy input data (F) as a function of fuel data 15 and the quantity of fuel 10 consumed by the engine and computer executable instructions for receiving the fuel data 15 from the Internet 60 as a function of one or more of the parameters: fuel type; fuel origin; fuel blend factors; and fuel seasonal factors. The vehicle data may comprise the mass of the vehicle and the change in speed of the vehicle, and the computer program code further comprises computer executable instructions for calculating the change in the kinetic energy data (K) as a function of the mass of the vehicle and the change in speed of the vehicle using a mathematical calculation or a lookup table. The vehicle data may comprise the mass of the vehicle and the change in height of the vehicle, and the computer program code further comprises computer executable instructions for calculating the change in the potential energy data (P) as a function of the mass of the vehicle and the change in height of the vehicle using a mathematical calculation or a lookup table.

Furthermore, the vehicle data may comprise the air density, the speed of the vehicle, and an aerodynamic friction coefficient, and the computer program code further comprises computer executable instructions for calculating the aerodynamic frictional losses data (A) as a function of the air density, the speed of the vehicle, and an aerodynamic friction coefficient using mathematical calculation or lookup table. The vehicle data may comprise the speed of the vehicle, the mass of the vehicle, and a mechanical friction coefficient, and the computer program code further comprises computer executable instructions for calculating the magnitude of the mechanical frictional losses data (M) as a function of the speed of the vehicle, the mass of the vehicle, and a mechanical friction coefficient using a mathematical calculation or lookup table.

Further, the computer program code further comprises computer executable instructions for calculating the change in height of the vehicle as a function of the speed of the vehicle and data from a motion sensor fixed to the vehicle.

Furthermore, the vehicle data may comprise change in kinetic energy data (K) and change in potential energy data (P) of the vehicle and the computer program code further comprising computer executable instructions for calculating the magnitude of braking frictional losses data (B) as a function of change in kinetic energy data (K) and change in potential energy data (P) of the vehicle under braking conditions.

Yet further, the motion sensor comprises one or more of a single or multi-axis accelerometer, a mechanical or solid-state gyroscope, a GPS system, and a differential GPS system using a ground station.

Further still, the computer program code further comprises computer executable instructions for calculating the aerodynamic friction coefficient in real time using a coast down method. The computer program code further comprises computer executable instructions for calculating the mechanical friction coefficient in real time using a coast down method.

Further, the computer program code further comprises computer executable instructions for causing a display device to display the vehicle efficiency factor (E) numerically, graphically, or pictorially via a display in the vehicle. The computer program further comprises computer executable instructions for calculating energy-flow-visualization data for the predetermined time interval.

Furthermore, the computer program further comprises computer executable instructions for calculating energy-flow-visualization data comprising information with regards to inter-conversion of one or more of the fuel chemical energy input data (F), the change in kinetic energy data (K), the change in potential energy data (P), the aerodynamic frictional losses data (A), and the mechanical frictional losses data (M) of the vehicle over the predetermined time interval. The computer program code further comprises computer executable instructions for calculating the energy flow visualization comprising a measure of vehicle efficiency and a measure of braking frictional losses data (B). The computer program code further comprises computer executable instructions for causing a display device to display the energy-flow-visualization data numerically, graphically, or pictorially via a monochrome or color display in the vehicle.

Yet further, the computer program code further comprises computer executable instructions for storing the vehicle efficiency factor (E) in the vehicle in real time and computer executable instructions for statistically calculating the vehicle efficiency map based on differing engine conditions, driving conditions, and environmental conditions. The engine conditions include one or more of the values of engine RPM, ignition advance, intake manifold absolute pressure, torque, throttle position, coolant temperature, intake air temperature, engine vibration (knock), engine misfire data, fuel type, or fuel flow rate.

Further, the driving conditions include one or more of the values of vehicle speed, longitudinal acceleration, vertical inclination angle, or lateral acceleration. The environmental conditions include one or more of the values of barometric pressure, ambient air temperature, or other weather parameters.

Furthermore, the computer program code further comprises computer executable instructions for calculating the current value of the vehicle efficiency factor (E) in real time, computer executable instructions for calculating a comparison data of the current value to the corresponding point on the vehicle efficiency map as a function of at least one of current vehicle conditions, driving conditions, environmental conditions, and energy-flow-visualization data and computer executable instructions for calculating a driver efficiency factor as a function of the comparison data.

Further, the computer program code further comprises computer executable instructions for causing a display device to display the driver efficiency factor numerically, graphically, or pictorially via a monochrome or color display in the vehicle.

Further, the vehicle comprises a cruise control system, and the computer program code further comprises computer executable instructions for controlling the cruise control system controlled as a function of maximization of the vehicle efficiency factor (E). Alternatively, the vehicle comprises a cruise control system, and the computer program code further comprises computer executable instructions for controlling the cruise control system as a function of the maximization of maximization of the driver efficiency factor.

Yet further, the computer program code further comprises computer executable instructions for causing a display device to display the vehicle efficiency value using color, wherein a first color indicates that the vehicle is being operated efficiently according to a first vehicle efficiency value and a second color indicates that the vehicle is being operated less efficiently according to a second vehicle efficiency value. The vehicle efficiency value corresponds to a driver efficiency factor or the vehicle efficiency factor (E). The first color is green and the second color is red. The one or more intermediate colors between the first color and the second color are used to represent the intermediate values between the first vehicle efficiency value and the second vehicle efficiency value.

Furthermore, the device may be global positioning system (GPS) or a portable digital assistant.

Furthermore, the computer program code can further comprise computer executable instructions for causing a display device to display the energy-flow-visualization data.

Further still, the device may be global positioning system (GPS) or a portable digital assistant.

Further, the computer program code further comprises computer executable instructions for causing the display device to display each of the fuel chemical energy input data (F), the change in kinetic energy data (K), and the change in potential energy data (P) as graphic volume elements interconnected by graphic connection elements, and computer executable instructions for causing the display device to display energy flow by a change in at least one characteristic of the graphic connection elements.

Furthermore, the computer program code further comprises computer executable instructions for causing the display device to display one or more of the aerodynamic frictional losses data (A), the mechanical frictional losses data (M), the braking frictional losses data (B), and other energy losses as energy flow out of one or more of the graphic connection elements. The computer program code further comprises computer executable instructions for causing the display device to display the graphic volume elements representing absolute energy values, costs of the energy, or carbon or CO2 mass equivalent of the energy.

Yet further, the computer program code further comprises computer executable instructions for causing the display device to display, if an inefficiency is present with respect to the inter-conversion of energy from or to any one or more of fuel chemical energy data (F), the change in kinetic energy data (K), the change in potential energy data (P), the aerodynamic frictional losses data (A), the mechanical losses data (M), and braking frictional losses data (B) and at least one characteristic of the graphic volume element is changed or at least one characteristic of one or more of the connecting graphic connection elements is changed.

In a yet further embodiment, there is provided a computer program code storage medium 420 for calculating the vehicle efficiency factor (E) for the vehicle powered by an internal combustion engine, the engine powered by a fuel, the computer program code storage medium 420 comprising computer program code as described above.

In another embodiment, there is provided a device comprising a processor, a display device operatively coupled to the processor, and a computer program code storage medium 420 as described above, the computer program code storage medium 420 being operatively coupled to the processor.

In another embodiment, there is provided the vehicle control system comprising a processor, and a computer program code storage medium 420 as described above, the computer program code storage medium 420 being operatively coupled to the processor.

In yet another embodiment, there is provided the vehicle comprising a display and the vehicle control system as described above, the display being operatively connected to the vehicle control system.

While the invention has been described with reference to a number of preferred or exemplary embodiments it should be appreciated that the invention can be embodied in many other forms. For example, in other embodiments, the information available to the driver may instead or further be made available through a wireless link or other RF telemetry to other personnel or administrators requiring such information such as, for example, a vehicle owner or maintenance crew.

Interpretation of Phrases:

Based On

Unless otherwise apparent from the language used, the term "based on" means "as a function of" or "calculated as a function of".

Wireless

The invention may be embodied using devices conforming to other network standards and for other applications, including, for example other WLAN standards and other wireless standards. Applications that can be accommodated include IEEE 802.11 wireless LANs and links, and wireless Ethernet. In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes

Unless specifically stated otherwise, as apparent from the following discussions, it is appreciated that throughout the specification discussions utilizing terms such as "processing", "computing", "calculating", "determining", "analyzing", or the like refer to the action and/or processes of a computer or computing system or similar electronic computing device that manipulate and/or transform data represented as physical, such as electronic, quantities into other data similarly represented as physical quantities.

Processor

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium

Furthermore, a computer-readable carrier medium may form or be included in a computer program product. A computer program product can be stored on a computer usable carrier medium, the computer program product comprising a computer readable program for causing a processor to perform a method as described herein.

Networked or Multiple Processors

In alternative embodiments, the one or more processors operate as a standalone device or may be connected, e.g., networked to other processor(s), in a networked deployment, the one or more processors may operate in the capacity of a server or a client machine in server-client network environment or as a peer machine in a peer-to-peer or distributed network environment. The one or more processors may form a web appliance, a network router, switch or bridge, or any machine capable of executing a set of instructions (sequential or otherwise) that specify actions to be taken by that machine.

It is noted that, while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that, when executed on one or more processors, cause a processor or processors to implement a method. Accordingly, aspects of the present invention may take the form of a method, an entirely hardware embodiment, an entirely software embodiment, or an embodiment combining software and hardware aspects. Furthermore, the present invention may take the form of carrier medium (e.g., a computer program product on a computer-readable storage medium) carrying computer-readable program code embodied in the medium.

Carrier Medium

The software may further be transmitted or received over a network through a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means or Measures For Carrying out a Method or Function

Furthermore, some of the embodiments are described herein as a method or combination of elements of a method that can be implemented by a processor of a processor device, computer system, or by other means or measures for carrying out the function. Thus, a processor with the necessary instructions for carrying out such a method or element of a method also forms a means for carrying out the method or element of a method. Furthermore, an element described herein of an apparatus embodiment is an example of a means for carrying out the function performed by the element for the purpose of carrying out the invention.

Coupled

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B that may be a path including other devices or measures. "Coupled" may mean that two or more elements are either in direct physical or electrical contact or that two or more elements are not in direct contact with each other but yet still co-operate or interact with each other.

Embodiments

Reference throughout this specification to "one embodiment" or "an embodiment" or "an exemplary embodiment" means that a particular feature, structure, or characteristic described in connection with the embodiment is included in at least one embodiment of the present invention. Thus, appearances of the phrases "in one embodiment" or "in an embodiment" or "an exemplary embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that, in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention and form different embodiments as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred or exemplary embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e., to specify the presence of the stated features but not to preclude the presence or addition of further features in various embodiments of the invention.

Any one of the terms including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms. For example, the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

INDUSTRIAL APPLICABILITY

It is apparent from the above, that the arrangements described are applicable to the automotive industry.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A method for determining an emission flow rate of at least one $CO_2$ equivalent gas from an exhaust system of an internal combustion engine of a vehicle, the engine powered by a fuel and the exhaust system comprising a catalytic converter, the method comprising:
collecting fuel data for the fuel;
generating an emissions factor for the at least one $CO_2$ equivalent gas;
collecting engine data for the engine;
collecting catalyst data for a catalyst;
generating a combustion factor for the at least one $CO_2$ equivalent gas; and
generating the emission flow rate for the at least one $CO_2$ equivalent gas based on a flow rate of the fuel to the engine and the respective emissions factor and the combustion factor.

2. The method according to claim 1, wherein:
the at least one $CO_2$ equivalent gas is $CO_2$ gas; and
the combustion factor is an oxidation factor.

3. The method according to claim 1, wherein:
the at least one $CO_2$ equivalent gas is at least one of $CH_4$, unburnt or partially burnt hydrocarbons (HC), CO, $N_2O$ or other nitrogen oxides (NOx), $SO_2$ or other sulfur oxides ($SO_x$), and non-methane volatile organic compounds (NMVOC); and
the combustion factor is a vehicle factor.

4. The method according to claim 1, wherein the engine data includes at least one of the measured values of air/fuel ratio, pre-catalyst oxygen sensor, engine RPM, ignition advance, torque, throttle position, coolant temperature, barometric pressure, intake air temperature, engine vibration (knock), and engine misfire data.

5. The method according to claim 1, wherein the catalyst data includes a catalyst type and at least one of the measured values of catalyst temperature, age, poisoning factors, post-catalyst oxygen sensor, secondary air status flags, and catalyst malfunction flags.

6. The method according to claim 1, wherein the step of collecting the fuel data is carried out by at least one of inputting of a fuel type to a lookup table and downloading the relevant fuel data from the Internet based on at least one of the parameters including fuel type, fuel origin, fuel blend factors, and fuel seasonal factors.

7. The method according to claim 1, wherein the step of generating the emissions factor is based on the fuel data and derived using mathematical calculation or reference to a lookup table.

8. The method according to claim 1, which further comprises generating a pre-catalyst gas content value based on the fuel data, the engine data, and the emissions factor and derived using mathematical calculation or reference to a lookup table.

9. The method according to claim 8, which further comprises generating a post-catalyst gas content value based on the respective pre-catalyst gas content value, the catalyst data, and the fuel data and derived using mathematical calculation or reference to a lookup table.

10. The method according to claim 9, wherein the step of generating the combustion factor is based on the respective post-catalyst gas content value and derived using mathematical calculation or reference to the lookup table.

11. The method according to claim 1, wherein the emission flow rate is a volumetric flow rate or a mass flow rate.

12. The method according to claim 11, wherein the volumetric flow rate or the mass flow rate is measured over a predetermined time interval to derive respectively either a gas total volume or a gas total mass.

13. The method according to claim 1, which further comprises combining the emission flow rate for the at least one $CO_2$ equivalent gases to derive an overall $CO_2$ equivalent emission flow rate.

14. The method according to claim 13, wherein the overall $CO_2$ equivalent emission flow rate is a volumetric flow rate or a mass flow rate.

15. The method according to claim 14, which further comprises measuring the volumetric flow rate or the mass flow rate of the overall $CO_2$ equivalent emission flow rate over a predetermined time interval to derive a respective $CO_2$ equivalent emission gas total volume or $CO_2$ equivalent emission gas total mass.

16. The method according to claim 15, which further comprises representing the overall $CO_2$ equivalent emission flow rate numerically, graphically, or pictorially through a display in the vehicle.

17. The method according to claim 16, which further comprises representing the gas total volume or the gas total mass numerically, graphically, or pictorially through a display in the vehicle.

* * * * *